US012791748B2

(12) United States Patent
Rohrkemper et al.

(10) Patent No.: US 12,791,748 B2
(45) Date of Patent: Nov. 10, 2026

(54) PASSIVE COMPONENT DETECTION THROUGH APPLIED ELECTROMAGNETIC FIELD AGAINST ELECTROMAGNETIC INTERFERENCE TEST PATTERN

(71) Applicant: ORACLE INTERNATIONAL CORPORATION, Redwood Shores, CA (US)

(72) Inventors: James Rohrkemper, Harbor Springs, MI (US); Yifan Wu, San Diego, CA (US); Guang C. Wang, San Diego, CA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/385,116

(22) Filed: Oct. 30, 2023

(65) Prior Publication Data

US 2024/0061139 A1 Feb. 22, 2024

Related U.S. Application Data

(63) Continuation of application No. 17/495,880, filed on Oct. 7, 2021, now Pat. No. 11,822,036.

(51) Int. Cl.
*G01V 3/10* (2006.01)

(52) U.S. Cl.
CPC .................................... *G01V 3/10* (2013.01)

(58) Field of Classification Search
CPC ............................... G01V 3/10; G06F 21/554
See application file for complete search history.

(56) References Cited

U.S. PATENT DOCUMENTS 3,705,516 A 12/1972 Reis
4,686,655 A 8/1987 Hyatt
(Continued)

FOREIGN PATENT DOCUMENTS

CN 107181543 A1 9/2017
CN 110941020 A1 3/2020
(Continued)

OTHER PUBLICATIONS

Bruschini, Claudio, "A Multidisciplinary Analysis of Frequency Domain Metal Detectors for Humanitarian Demining", Global CWD Repository 2002 (243 pgs).
(Continued)

*Primary Examiner* — Raul J Rios Russo
*Assistant Examiner* — Haidong Zhang
(74) *Attorney, Agent, or Firm* — Kraguljac Law Group LLC

(57) ABSTRACT

Systems, methods, and other embodiments for passive component (e.g., spychip) detection through polarizability and advanced pattern recognition are described. In one embodiment a method includes applying an electromagnetic field to a target electronic system while the target electronic system is emitting a test pattern of electromagnetic interference. The method takes measurements of combined electromagnetic field strength emitted by the target electronic system while the electromagnetic field is being applied. The method detects the passive component based on dissimilarity between the measurements and estimates of electromagnetic field strength for the test pattern for a golden electronic system. The golden electronic system is of similar construction to the target electronic system and does not include the passive component. The method generates an electronic alert that the passive component is present in the target electronic system.

20 Claims, 12 Drawing Sheets

(56) References Cited

U.S. PATENT DOCUMENTS

| | | | |
|---|---|---|---|
| 5,619,616 | A | 4/1997 | Brady et al. |
| 5,684,718 | A | 11/1997 | Jenkins et al. |
| 7,020,802 | B2 | 3/2006 | Gross et al. |
| 7,191,096 | B1 | 3/2007 | Gross et al. |
| 7,281,112 | B1 | 10/2007 | Gross et al. |
| 7,292,659 | B1 | 11/2007 | Gross et al. |
| 7,391,835 | B1 | 6/2008 | Gross et al. |
| 7,542,995 | B2 | 6/2009 | Thampy et al. |
| 7,573,952 | B1 | 8/2009 | Thampy et al. |
| 7,613,576 | B2 | 11/2009 | Gross et al. |
| 7,613,580 | B2 | 11/2009 | Gross et al. |
| 7,702,485 | B2 | 4/2010 | Gross et al. |
| 7,703,325 | B2 | 4/2010 | Wu |
| 7,869,977 | B2 | 1/2011 | Lewis et al. |
| 8,055,594 | B2 | 11/2011 | Dhanekula et al. |
| 8,069,490 | B2 | 11/2011 | Gross et al. |
| 8,150,655 | B2 | 4/2012 | Dhanekula et al. |
| 8,200,991 | B2 | 6/2012 | Vaidyanathan et al. |
| 8,214,682 | B2 | 7/2012 | Viadyanathan et al. |
| 8,275,738 | B2 | 9/2012 | Gross et al. |
| 8,341,759 | B2 | 12/2012 | Gross et al. |
| 8,365,003 | B2 | 1/2013 | Gross et al. |
| 8,452,586 | B2 | 5/2013 | Master et al. |
| 8,457,913 | B2 | 6/2013 | Zwinger et al. |
| 8,543,346 | B2 | 9/2013 | Gross et al. |
| 8,983,677 | B2 | 3/2015 | Wright et al. |
| 9,093,120 | B2 | 7/2015 | Bilobrov |
| 9,514,213 | B2 | 12/2016 | Wood et al. |
| 9,911,336 | B2 | 3/2018 | Schlechter et al. |
| 9,933,338 | B2 | 4/2018 | Noda et al. |
| 10,015,139 | B2 | 7/2018 | Gross et al. |
| 10,149,169 | B1 | 12/2018 | Keller |
| 10,452,510 | B2 | 10/2019 | Gross et al. |
| 10,496,084 | B2 | 12/2019 | Li et al. |
| 10,860,011 | B2 | 12/2020 | Gross et al. |
| 10,929,776 | B2 | 2/2021 | Gross et al. |
| 11,042,428 | B2 | 6/2021 | Gross et al. |
| 11,055,396 | B2 | 7/2021 | Gross et al. |
| 11,255,894 | B2 | 2/2022 | Wetherbee et al. |
| 11,392,786 | B2 | 7/2022 | Gross et al. |
| 2003/0033094 | A1 | 2/2003 | Huang |
| 2003/0061008 | A1 | 3/2003 | Smith et al. |
| 2006/0122934 | A1* | 6/2006 | White .................. G06K 7/0008 705/50 |
| 2007/0288242 | A1 | 12/2007 | Spengler et al. |
| 2008/0140362 | A1 | 6/2008 | Gross et al. |
| 2008/0252309 | A1 | 10/2008 | Gross et al. |
| 2008/0252441 | A1 | 10/2008 | McElfresh et al. |
| 2008/0256398 | A1 | 10/2008 | Gross et al. |
| 2009/0077351 | A1 | 3/2009 | Nakaike et al. |
| 2009/0099830 | A1* | 4/2009 | Gross ................. G01R 31/2813 703/14 |
| 2009/0115635 | A1 | 5/2009 | Berger et al. |
| 2009/0125467 | A1 | 5/2009 | Dhanekula et al. |
| 2009/0306920 | A1* | 12/2009 | Zwinger ............ G01R 31/2884 324/750.01 |
| 2010/0023282 | A1 | 1/2010 | Lewis et al. |
| 2010/0033386 | A1 | 2/2010 | Lewis et al. |
| 2010/0080086 | A1 | 4/2010 | Wright et al. |
| 2010/0161525 | A1 | 6/2010 | Gross et al. |
| 2010/0305892 | A1 | 12/2010 | Gross et al. |
| 2010/0306165 | A1 | 12/2010 | Gross et al. |
| 2012/0030775 | A1 | 2/2012 | Gross et al. |
| 2012/0111115 | A1 | 5/2012 | Ume et al. |
| 2013/0157683 | A1 | 6/2013 | Lymberopoulos et al. |
| 2013/0211662 | A1 | 8/2013 | Blumer et al. |
| 2014/0354300 | A1 | 12/2014 | Ramachandran et al. |
| 2015/0137830 | A1 | 5/2015 | Keller, III et al. |
| 2016/0097833 | A1 | 4/2016 | Han et al. |
| 2016/0098561 | A1 | 4/2016 | Keller et al. |
| 2016/0239934 | A1* | 8/2016 | Soborski ................. G06F 21/44 |
| 2016/0258378 | A1 | 9/2016 | Bizub et al. |
| 2017/0163669 | A1 | 6/2017 | Brown et al. |
| 2017/0301207 | A1 | 10/2017 | Davis et al. |
| 2018/0011130 | A1 | 1/2018 | Aguayo Gonzalez et al. |
| 2018/0060203 | A1 | 3/2018 | Gupta et al. |
| 2018/0160020 | A1 | 6/2018 | Djakovic et al. |
| 2018/0276044 | A1 | 9/2018 | Fong et al. |
| 2018/0349797 | A1 | 12/2018 | Garvey et al. |
| 2019/0064034 | A1 | 2/2019 | Fayfield |
| 2019/0064384 | A1 | 2/2019 | Huang et al. |
| 2019/0102718 | A1 | 4/2019 | Agrawal |
| 2019/0163719 | A1 | 5/2019 | Gross et al. |
| 2019/0196892 | A1 | 6/2019 | Matei et al. |
| 2019/0197145 | A1 | 6/2019 | Gross et al. |
| 2019/0237997 | A1 | 8/2019 | Tsujii et al. |
| 2019/0243799 | A1 | 8/2019 | Gross et al. |
| 2019/0286725 | A1 | 9/2019 | Gawlick et al. |
| 2019/0324430 | A1 | 10/2019 | Herzog et al. |
| 2019/0378022 | A1 | 12/2019 | Wang et al. |
| 2020/0125819 | A1 | 4/2020 | Gross et al. |
| 2020/0144204 | A1 | 5/2020 | Keller, III et al. |
| 2020/0191643 | A1 | 6/2020 | Davis |
| 2020/0201950 | A1 | 6/2020 | Wang et al. |
| 2020/0242471 | A1 | 7/2020 | Busch |
| 2020/0387753 | A1 | 12/2020 | Brill et al. |
| 2021/0055083 | A1* | 2/2021 | Zheng ................... F41H 11/136 |
| 2021/0081573 | A1 | 3/2021 | Gross et al. |
| 2021/0158202 | A1 | 5/2021 | Backlawski et al. |
| 2021/0174248 | A1 | 6/2021 | Wetherbee et al. |
| 2021/0270844 | A1 | 9/2021 | Wetherbee et al. |
| 2021/0270884 | A1 | 9/2021 | Wetherbee et al. |
| 2022/0121955 | A1 | 4/2022 | Chavoshi et al. |
| 2023/0054215 | A1 | 2/2023 | Mishima et al. |

FOREIGN PATENT DOCUMENTS

| | | | |
|---|---|---|---|
| DE | 4447288 | B4 | 7/1994 |
| DE | 4447288 | A1 | 7/1995 |
| DE | 60017609 | T2 | 10/2005 |
| DE | 102018207176 | A1 | 11/2019 |
| KR | 20030020964 | A | 3/2003 |
| KR | 20210082971 | A | 7/2021 |
| WO | 2015035264 | A1 | 3/2015 |
| WO | 2017187333 | A1 | 11/2017 |
| WO | 2020215116 | A1 | 10/2020 |
| WO | 2021166128 | A1 | 8/2021 |

OTHER PUBLICATIONS

Kan, Michael, “Does Your Motherboard have a Secret Chinese Spy Chip?”, PC Magazine Oct. 5, 2018 (10 pgs).

Wikipedia, “Polarizability,” taken from https://wipipedia.org/w/index.php?title=Polarizability&oldid=1024366656, Sep. 3, 2021 (4 pgs).

Seyerlehner, Klaus et al., “Frame Level Audio Similarity—A Codebook Approach”, Proc. of the 11th Int. Conference on Digital Audio Effects (DAFx-08), Espoo, Finland, Sep. 1-4, 2008 (8 pgs).

Yesilli et al., “On Transfer Learning for Chatter Detection in Turning using Wavelet Packet Transform and Ensemble Empirical Mode Decomposition”, CIRP Journal of Manufacturing Science and Technology, Elsevier, Amsterdam, NL, vol. 28, Dec. 30, 2019 (Dec. 30, 2019), pp. 118-135.

US Patent and Trademark Office, “Non-Final Office Action”, issued in U.S. Appl. No. 17/495,880 having a date of mailing of Nov. 10, 2022 (6 pgs).

Singer, et al., “Model-Based Nuclear Power Plant Monitoring and Fault Detection: Theoretical Foundations,” Intelligent System Application to Power Systems (ISAP ’97), Jul. 6-10, 1997, Seoul, Korea pp. 60-65.

Gross, K. C. et al., “Application of a Model-Based Fault Detection System to Nuclear Plant Signals,” downloaded from https://www.researchgate.net/publication/236463759; Conference Paper: May 1, 1997, 5 pages.

Patent Cooperation Treaty, “International Search Report and Written Opinion”, issued in PCT International Application No. PCT/US2021/062592 (International Filing Date of Dec. 9, 2021) having a mailing date of Jun. 14, 2022 (13 pages).

Patent Cooperation Treaty (PCT), International Search Report and Written Opinion issued in PCT International Application No. PCT/US2020/060083 having a date of mailing of Mar. 19, 2021 (13 pgs).

(56) References Cited

OTHER PUBLICATIONS

Patent Cooperation Treaty (PCT), International Search Report and Written Opinion issued in PCT International Application No. PCT/US2021/015802 having a date of mailing of May 28, 2021 (13 pgs).
Patent Cooperation Treaty (PCT), International Search Report and Written Opinion issued in PCT International Application No. PCT/US2021/013633 having a date of mailing of May 6, 2021 (10 pgs).
Patent Cooperation Treaty (PCT), International Search Report and Written Opinion issued in PCT International Application No. PCT/US2021/014106 having a date of mailing of Apr. 26, 2021 (9 pgs).
Patent Cooperation Treaty (PCT), International Search Report and Written Opinion issued in PCT International Application No. PCT/US2021/015359 having a date of mailing of Apr. 9, 2021 (34 pgs).
Wang et al., Process Fault Detection Using Time-Explicit Kiviat Diagrams:, AL CHE Journal 61.12 (2015): 4277-4293).
Ray; Frequency Calibration for SDRs Without GPS, pp. 1-9, Feb. 15, 2018; downloaded from: https://www.amsat.org/wordpress/wp-content/uploads/2018/02/2017Symposium-SDR-Freq-Calibration.pdf.
Mishima et al., Abnormality Estimation Apparatus, Abnormality Estimation Method, and Computer-Readable Recording Medium, machine translation of WO 2021166128 A1.
Wang et al., Machine Condition Monitoring and Fault Prediction System, machine translation of DE 4447288 A1.
Im et al., Method and Apparatus for Performing Vibration Shake Test of Satellites, machine translation of KR 20210082971 A.
Diamond et al., A Method and System for Monitoring Rotor Blades of a Turbomachine Using Blade Tip Timing (BTT), machine translation of WO 2017187333 A1.
Lafleur et al., Arrangement and Method for Vibration Testing with Acoustic Waves, machine translation of DE 60017609 T2.
Grasreiner et al., Method and Control Unit for Detecting Rough Running of a Drive, machine translation of DE 102018207176 A1.
Yesilli et al., On Transfer Learning for Chatter Detection in Turning Using Wavelet Packet Transform and Ensemble Empirical Mode Decomposition, CIRP Journal of Manufacturing Science and Technology 28 (2020) 118-135.
Whisnant et al; "Proactive Fault Monitoring in Enterprise Servers", 2005 IEEE International Multiconference in Computer Science & Computer Engineering, Las Vegas, NV, Jun. 27-30, 2005.
U.S. Nuclear Regulatory Commission: "Technical Review of On-Lin Monitoring Techniques for Performance Assessment vol. 1: State-of-the-Art", XP055744715, Jan. 31, 2006, pp. 1-132.
Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.
Guo, "Implementation of 3D kiviat diagrams." (2008) Year: 2008 pp. 1-37.
Abran et al., "Estimation models based on functional profiles." Intl. Workshop on Software Measurement—IWSM/MetriKon, Kronisburg (Germany) Shaker Verlag. 2004 (Year: 2004).
Claudio Bruschini, Vrije Universiteit Brussel; A Multidisciplinary Analysis of Frequency Domain Metal Detectors for Humanitarian Demining, Sep. 2002; pp. 1-243; James Madison University JMU Scholarly Commons; Global CWD Repository, Center for Intl. Stabilization and Recovery.
Michael Kan; Does Your Motherboard Have a Secret Chinese Spy Chip?; Oct. 5, 2018, pp. 1-9, downloaded on Sep. 3, 2021 from: https://www.pcmag.com/news/does-your-motherboard-have-a-secret-chinese-spy-chip.
Wikipedia; Polarizability; pp. 1-4; downloaded on Sep. 3, 2021 from: https://en.wikipedia.org/w/index.php?title=Polarizability&oldid=1024366656.
Garcia-Martin; Estimation of Energy Consumption in Machine Learning; Nov. 2018; pp. 1-14; J. Parallel Distrib. Computing, ISSN 0743-7315, E-ISSN 1096-0848, vol. 134.
Huang et al.; Electronic Counterfeit Detection Based on the Measurement of Electromagnetic Fingerprint; Microelectronics Reliability 55 (2015) pp. 2050-2054.
Bouali et al; Visual Mining of Time Series Using a Tubular Visualization; Vis Comput (2016) 32: 15-30; published online: Dec. 5, 2014 (Springer-Verlag Berlin Heidelberg 2014).
Deepika et al; Design & Development of Location Identification Using RFID With WiFi Positioning Systems; pp. 488-493; downloaded from IEEE Xplore on May 17, 2021.
Dickey et al.; Checking for Autocorrelation in Regression Residuals; pp. 959-965; Proceedings of 11th Annual SAS Users Group International Conference; 1986.
Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.
Kenny Gross, Oracle Labs; MSET2 Overview: "Anomaly Detection and Prediction" Oracle Cloud Autonomous Prognostics; p. 1-58; Aug. 8, 2019.
Huang H, et al. "Electronic counterfeit detection based on the measurement of electromagnetic fingerprint," Microelectronics Reliability: An Internat . Journal & World Abstracting Service, vol. 55, No. 9, Jul. 9, 2015 (Jul. 9, 2015) pp. 2050-2054.
Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.
Deepka et al., "Design and Development of Location Identification Using RFID with WiFi Positioning Systems", 2017 Ninth International Conference on Ubiquitous and Future Networks (ICUFN), IEEE, 2017.
Whisnant et al.; "Proactive Fault Monitoring in Enterprise Servers," IEEE—International Multiconference in Computer Science & Computer Engineering (Jun. 27-30, 2005) 11 pgs.
US Nuclear Regulatory Commission; "Technical Review of On-Line Monitoring Techniques for Performance Assessment," vol. 1, Jan. 31, 2006.
Wald, A, "Sequential Probability Ratio Test for Reliability Demonstration", John Wiley & Sons, 1947.
Patent Cooperation Treaty (PCT), International Search Report and Written Opinion issued in PCT International Application No. PCT/US2021/062592 having a date of mailing of Jun. 14, 2022 (13 pgs).
Lopez-Oriona, et al., Quantile-Based Fuzzy Clustering of Multivariate Time Series in the Frequency Domain; Elsevier—Fuzzy Sets and Systems 433 (2022) pp. 115-154).
Holan et al.; Time Series Clustering and Classification via Frequency Domain Methods; WIREs Computational Statistics / vol. 10, Issue 6 / e1444; pp. 1-3; first published Jul. 20, 2018.
Abebe Diro et al.; A Comprehensive Study of Anomaly Detection Schemes in IoT Networks Using Machine Learning Algorithms; pp. 1-13; 2021; downloaded from: https://doi.org/10.3390/s21248320.
Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.
Sutrisno Edwin: "Midimax Compression for Large Time-Series Data", dated Apr. 18, 2022, pp. 1-8, retrieved from the Internet at: URL:http://towardsdatascience.com/midimax-data-compression-for-large-time-series-data-daf744c89310, retrieval date Nov. 1, 2023.
Lkhagva B et al: "New Time Series Data Representation ESAX for Financial Applications", Data Engineering Workshops 2006, Proceedings 22nd International Conference on Atlanta GA, USA Apr. 3-7, 2006 Piscataway, NJ, USA IEEE. (6 pgs.).
Choi Kukjin et al: "Deep Learning for Anomaly Detection in Time-Series Data: Review, Analysis, and Guidelines", IEEE Access, IEEE, USA, vol. 9, Aug. 26, 2021, p.
Gross Kenny et al: "AI Decision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.

* cited by examiner

PASSIVE COMPONENT DETECTION THROUGH APPLIED ELECTROMAGNETIC FIELD AGAINST ELECTROMAGNETIC INTERFERENCE TEST PATTERN

CROSS REFERENCE TO RELATED APPLICATION

This disclosure is a continuation of and claims the benefit of priority to U.S. patent application Ser. No. 17/495,880, entitled "Passive Spychip Detection Through Time Series Monitoring of Induced Magnetic Field and Electromagnetic Interference," filed Oct. 7, 2021, which is incorporated herein by reference in its entirety for all purposes.

BACKGROUND

There presently exist significant security concerns across the enterprise computing industry around spychips in electronic systems. A spychip is a device that can be surreptitiously incorporated into an electronic system to modify software or firmware, exfiltrate data, or perform other malicious activities. Electromagnetic interference (EMI) fingerprinting techniques—that is, techniques to identify component configurations of electronic devices based on the unique electromagnetic signals given off by a particular configuration during operation—have been developed to detect the presence of spychips and counterfeit components that are actively "on" and emitting EMI frequencies. But, a spychip may not always be actively on. Instead, a spychip may be turned "off" for a great majority of the time while the electronic system is active, and turned "on" briefly to perform malicious activities before returning to an "off" state. Such passive spychips may not be detected in an EMI fingerprinting scan that runs to completion in a few minutes.

What is desired is a detection approach that can detect the presence (or certify the absence) of passive spychips in an electronic system without requiring continuous EMI emission from the spychip.

SUMMARY

In one embodiment, a computing system for detection of a passive component is described. The computing system includes at least one processor operably connected to at least one memory. The computing system includes a radio transmitter operably connected to the processor and memory. The computing system includes a radio receiver operably connected to the processor and memory. And, the computing system includes one or more non-transitory computer-readable media operably connected to the processor and memory. The computer-readable media store computer-executable instructions that when executed by at least one of the processors cause the computing system to execute steps of a process to detect the passive component.

The instructions cause the computer to apply an electromagnetic field to a target electronic system using the radio transmitter while the target electronic system is emitting a test pattern of electromagnetic interference. The instructions cause the computer to take measurements of combined electromagnetic field strength emitted by the target electronic system using the radio receiver while the electromagnetic field is being applied. The instructions cause the computer to detect the passive component based on dissimilarity between the measurements and estimates of electromagnetic field strength for the test pattern for a golden electronic system of similar construction to the target electronic system that does not include the passive component. And, the instructions cause the computer to generate an electronic alert that the passive component is present in the target electronic system.

In one embodiment, the instructions also cause the computing system to perform steps to train the machine learning model. The instructions cause the computer to apply the electromagnetic field to the golden electronic system using the radio transmitter while the golden electronic system is executing the waveform workload. The instructions cause the computer to take second measurements of a second combined magnetic field strength emitted by the golden electronic system using the radio receiver during the execution of the waveform workload and application of the electromagnetic field. And, the instructions cause the computer to train the machine learning model to generate the estimates based on the second measurements.

In one embodiment, the instructions for taking measurements further cause the computing system to perform a frequency-domain to time-domain transformation of the measurements.

In one embodiment, the computing system includes additional components. The computing system further includes a transmitting coil connected as an antenna of the radio transmitter. The instructions further cause the computing system to apply the electromagnetic field to the target electronic system by the radio transmitter through the transmitting coil. The computing system also includes a receiving coil connected as an antenna of the radio receiver. The instructions further cause the computing system to take the measurements of combined electromagnetic field strength with the radio receiver through the receiving coil. The transmitting coil and receiving coil are arranged concentrically, with the transmitting coil positioned within the receiving coil.

In one embodiment, the instructions further cause the computing system to, in response to the electronic alert that the passive component is present, generate a graphical user interface that indicates that the presence of the passive component is suspected.

In one embodiment, the passive component is a spychip.

In one embodiment, the instructions further cause the machine learning model to execute a multivariate state estimation technique.

In one embodiment, a method for detection of a passive component is described. In one embodiment, the method includes a step of applying an electromagnetic field to a target electronic system while the target electronic system is emitting a test pattern of electromagnetic interference. The method includes a step of taking measurements of combined electromagnetic field strength emitted by the target electronic system while the electromagnetic field is being applied. The method includes a step of detecting the passive component based on dissimilarity between the measurements and estimates of electromagnetic field strength for the test pattern for a golden electronic system of similar construction to the target electronic system that does not include the passive component. And, the method includes a step of generating an electronic alert that the passive component is present in the target electronic system.

In one embodiment, the method also includes a step of executing, on the target electronic system, a waveform workload that causes the target electronic system to emit the test pattern.

In one embodiment, the method also includes a step of executing, on the golden electronic system, a waveform workload that causes the golden electronic system to emit the test pattern. The method then includes a step of applying the electromagnetic field to the golden electronic system while the golden electronic system is executing the waveform workload. The method also includes a step of taking second measurements of a second combined magnetic field strength emitted by golden electronic system during the execution of the waveform workload and application of the electromagnetic field. And, the method also includes a step of training the machine learning model to generate the estimates based on the second measurements.

In one embodiment, the step of taking measurements includes a frequency-domain to time-domain transformation of the measurements.

In one embodiment, the electromagnetic field is applied to the target electronic system by a radio transmitter configured with a transmitting coil. The measurements of combined electromagnetic field strength are taken by a radio receiver configured with a receiving coil. And, the transmitting coil and receiving coil are arranged concentrically, with the transmitting coil positioned within the receiving coil.

In one embodiment, the test pattern is a repeating pattern. For example, the test pattern may be a sinusoidal pattern.

In one embodiment, the machine learning model executes a non-linear, non-parametric regression algorithm.

In one embodiment, one or more non-transitory computer-readable media are described. The one or more non-transitory computer-readable media include stored thereon computer-executable instructions. The computer-executable instructions, when executed by at least a processor of a computer cause the computer to execute steps of a process to detect a passive component. The instructions cause the computer to apply an electromagnetic field to a target electronic system while the target electronic system is emitting a test pattern of electromagnetic interference. The instructions cause the computer to take measurements of combined electromagnetic field strength emitted by the target electronic system while the electromagnetic field is being applied. The instructions cause the computer to detect the passive component based on dissimilarity between the measurements and estimates of electromagnetic field strength for the test pattern for a golden electronic system of similar construction to the target electronic system that does not include the passive component. And, the instructions cause the computer to generate an electronic alert that the passive component is present in the target electronic system.

In one embodiment, the instructions stored on the non-transitory computer-readable media further cause the target electronic system to execute a waveform workload that causes the target electronic system to emit the test pattern.

In one embodiment, the instructions stored on the non-transitory computer-readable media further cause the golden electronic system to execute a waveform workload that causes the golden electronic system to emit the test pattern. And, the instructions further cause the computer to (1) apply the electromagnetic field to the golden electronic system while the golden electronic system is executing the waveform workload; (2) take second measurements of a second combined magnetic field strength emitted by the golden electronic system during the execution of the waveform workload and application of the electromagnetic field; and (3) train the machine learning model to generate the estimates based on the second measurements.

In one embodiment, the instructions stored on the non-transitory computer-readable media for taking measurements further cause the computer to perform a frequency-domain to time-domain transformation of the measurements.

In one embodiment, the instructions stored on the non-transitory computer-readable media further cause the computer to, in response to the electronic alert that the passive component is present, generate a graphical user interface that indicates that the presence of the passive component is suspected.

In one embodiment, the estimates of electromagnetic field strength for the test pattern for a golden electronic system are estimates of combined electromagnetic field strength for the test pattern and emissions induced by application of the electromagnetic field to the golden electronic system.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
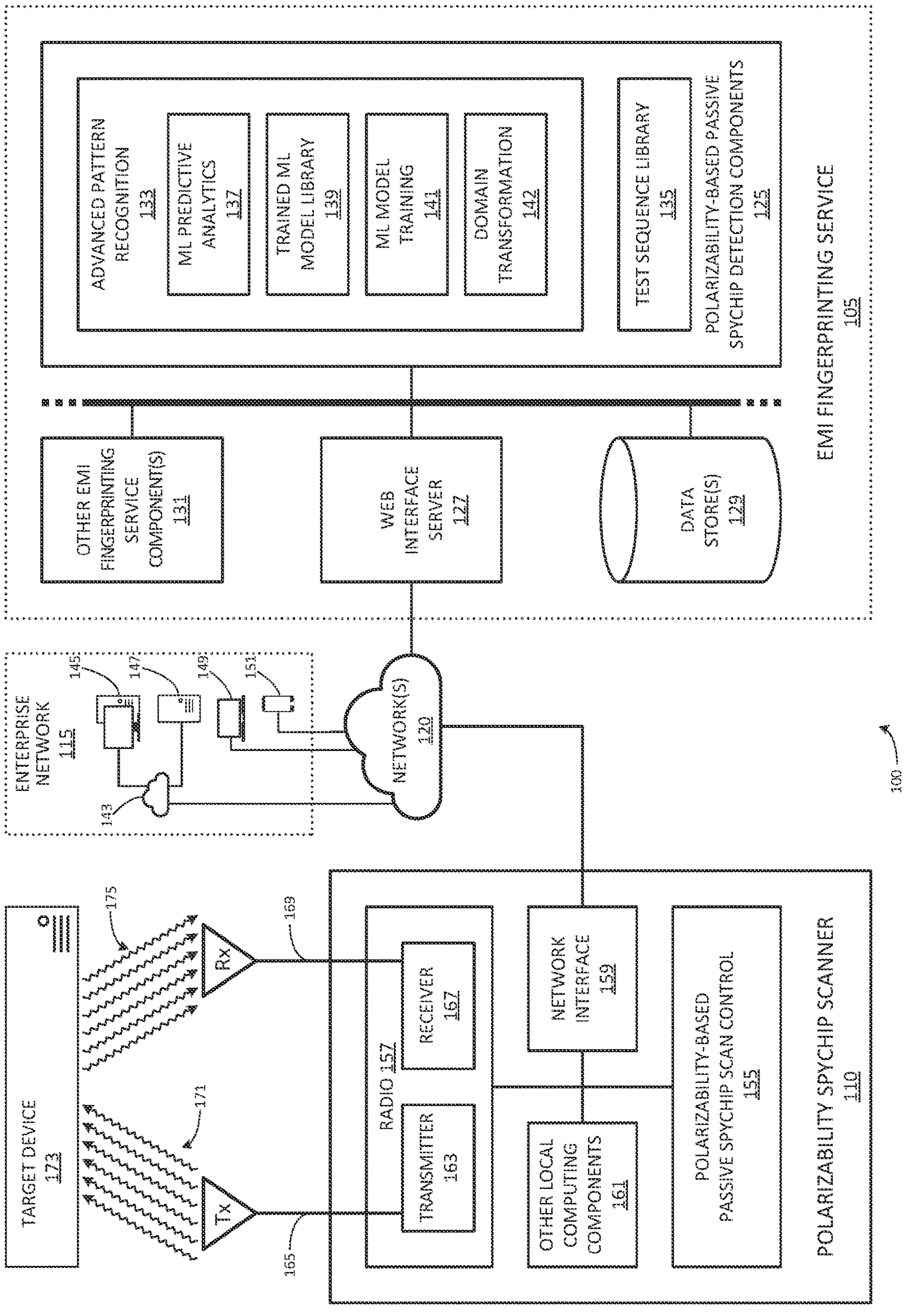
FIG. 1 illustrates one embodiment of a system associated with passive spychip detection through polarizability and advanced pattern recognition.

Systems, methods, and other embodiments are described herein that provide passive spychip detection through monitoring induced magnetic field(s) against dynamic electromagnetic interference. The passive spychip detection by the systems, methods, and other embodiments may be achieved through polarizability and advanced pattern recognition. Embodiments described herein enable the non-invasive determination of an electronic device, such as a server computing device or firewall device, to either (i) be free of passive spychips, or (ii) include one or more passive spychips. Embodiments described herein further enable this determination to be made practically in real time.

EMI signals are generated by electronic devices such as computers, servers, routers, switches, and firewalls during operation. These EMI signals are commonly regarded as noise, but these EMI signals can also carry information that can be used to generate unique EMI fingerprints for the electronic device. For example, an electronic device with a particular configuration of components may be operated in accordance with a test sequence (a deterministic stress load) and the resulting test pattern of emission spectra given off by the electronic device can be scanned to generate an EMI fingerprint for the electronic device. Where the electronic device is of a known configuration verified to be free of spychips or counterfeit components—also referred to as a "golden system"—the generated EMI fingerprint may be used as a reference fingerprint for the electronic device. Other electronic devices that are supposed to be of the same configuration as the golden system running the same test sequence may be scanned in a similar manner to create an EMI fingerprint of the other device. This EMI fingerprint of the other device may be compared to the reference fingerprint to confirm that the other electronic device either is or is not of the same configuration as the golden system. Electronic devices that are not of the same configuration may contain one or more spy chips or counterfeit components. Further, electronic devices that are known to have a particular spychip may similarly be scanned to generate a reference fingerprint of that particular configuration of compromised electronic device, allowing for direct matching against a database of known spychip-compromised configurations. In general, scanning the emission spectra of a suspect system while it is running a deterministic stress load and comparing the emission spectra to the emission spectra of an authentic, uncompromised system running the same deterministic stress load works well. Such EMI fingerprinting operations are the best solutions for the use cases where the counterfeit components or spy chips always actively emit EMI. EMI fingerprinting is capable of detecting almost all types of active spychip (or counterfeit component) scenarios where the spychip or other suspect electronic components are actively working during the test sequence, but risks failure if the spychip is not emitting any EMI at the time of scan.

There is a small class of spychips—passive spychips—that remain turned off or inactive for most of the time (99% or more of the time), turn on or activate briefly to perform malicious activities, and then return to an inactive off state. When not active, these passive spychips do not emit any EMI at all. The rare but realistic challenge presented by these passive spychips is that they might not be detected by previous EMI fingerprinting solutions. This is especially true where the EMI fingerprint detection scan for an electronic device lasts for about 10 minutes, during which period a passive spychip may not activate.

The systems and methods described herein for passive spychip detection through polarizability and advanced pattern recognition are not presented for the detection of actively emitting spychips and other counterfeit components. These active components are satisfactorily detected by other EMI fingerprinting techniques. Instead, the systems and methods described herein for passive spychip detection through polarizability and advanced pattern recognition effectively and accurately detect passive spychips in electronic devices using the phenomenon of polarizability to drive a response from the passive spychip. This improves discrimination capability of EMI fingerprinting by enabling detection of the presence (or certifying the absence) of any unexpected electronic components (with any metal components inside) without requiring a continuously emitting EMI spectrum from the unexpected electronic component. The technique for passive spychip detection through polarizability and advanced pattern recognition is a robust, non-invasive, non-destructive method of detecting small metal-containing or otherwise conductive objects (such as spychips) inside electronic devices. Thus, advantageously, the EMI fingerprinting systems and methods described herein for passive spychip detection through polarizability and advanced pattern recognition detects a passive spychip even when the passive spychip is not actively emitting or is turned off. This eliminates a small missed-alarm probability of EMI fingerprinting where rare passive spychips are present but not turned on at the time of the scan. The systems and methods described herein for passive spychip detection through polarizability and advanced pattern recognition find applicability across all realms of computing hardware, enabling passive spychip detection in enterprise computing systems and networks, as well as in defense military electronic systems.

In another advantage, the EMI fingerprinting systems and methods described herein for passive spychip detection through polarizability and advanced pattern recognition do not involve disassembly of the device to perform visual or photographic inspections. Such disassembly may cause damage to or otherwise impair performance of the electronic device. Also, in one embodiment, the EMI fingerprinting systems and methods described herein for passive spychip detection through polarizability and advanced pattern recognition can provide a simple "all-clear" decision that indicates a target electronic device being scanned contains no passive spychips, or else generates an electronic alert, alarm, or warning that the target electronic device being scanned is suspected to contain one or more passive spychips. This makes the scanning procedure usable by non-expert personnel who can understand the results without training in EMI radiation science, data science, machine learning, or spychip detection techniques. Further, in one embodiment, EMI fingerprinting systems and methods described herein for passive spychip detection through polarizability and advanced pattern recognition enable the detection and identification of spychips in an autonomous fashion so that personnel involved in acceptance testing of electronic devices can quickly identify electronic devices that contain spychips, or certify electronic devices as having no spychips.

No action or function described or claimed herein is performed by the human mind. An interpretation that any action or function can be performed in the human mind is inconsistent and contrary to this disclosure.

—Example System for Passive Spychip Detection—

FIG. 1 illustrates one embodiment of a system 100 associated with passive spychip detection through monitoring induced magnetic field (due to polarizability) against dynamic EMI with advanced ML pattern recognition. Environment 100 includes EMI fingerprinting service 105, a polarizability spychip scanner 110, and an enterprise network 115, each interconnected by communications network (s) 120 such as the Internet and private networks connected to the Internet.

In one embodiment, EMI fingerprinting service 105 includes various component systems such as polarizability-based passive spychip detection components 125, web interface server 127, data store(s) 129, and other EMI fingerprinting service component(s) 131. Each of these component systems is configured with logic, for example by various software modules, for executing the functions they are described as performing. In one embodiment, the components of EMI fingerprinting service 105 are implemented on one or more hardware computing devices or hosts interconnected by a data network or cloud network. For example, the components of EMI fingerprinting service 105 may be executed by network-connected computing devices of one or more compute hardware shapes, such as general purpose central processing unit (CPU) shapes, dense input/output (I/O) shapes, graphics processing unit (GPU) shapes, High-Performance computing (HPC) shapes, or other enterprise server hardware shapes. In one embodiment, the components of EMI fingerprinting service 105 are each implemented by dedicated computing devices. In one embodiment, several or all components of EMI fingerprinting service 105 are implemented by a common (or shared) computing device, even though represented as discrete units in FIG. 1. In one embodiment, components of EMI fingerprinting service 105 may be implemented across multiple computing devices.

In one embodiment, polarizability-based passive spychip detection components 125 of EMI fingerprinting service 105 include advanced pattern recognition components 133 and test sequence library 135. Advanced pattern recognition components 133 may include ML predictive analytics modules 137, trained ML model library 139, ML model training modules 141, and domain transformation modules 142. In one embodiment, advanced pattern recognition components 133 are configured to implement one or more non-linear non-parametric (NLNP) regression algorithms used for multivariate anomaly detection, including neural networks (NNs), Support Vector Machines (SVMs), autoassociative kernel regression (AAKR), and similarity-based modeling (SBM) such as the multivariate state estimation technique (MSET) (including Oracle's proprietary Multivariate State Estimation Technique (MSET2)) (altogether, "ML Anomaly Detection" algorithms). ML model training modules 141 are configured to train an ML Anomaly Detection algorithm to predict or estimate time series magnetic field values based on measured time series magnetic field values for a golden system electronic device, for example as shown and described in further detail herein. Trained ML model library 139 is configured to accept trained ML Anomaly Detection algorithms/models from ML model training modules 141 for storage, store them, and provide them in response to retrieval requests by ML predictive analytics modules 137. In one embodiment, ML predictive analytics modules 137 are configured to execute a trained ML Anomaly Detection algorithm/model to generate estimated time series magnetic field values based on monitored time series magnetic field values of a unit under test. ML predictive analytics modules are further configured to then determine whether the monitored time series magnetic field values deviate anomalously from predicted values, indicating the presence of a passive spychip, for example as shown and described in further detail herein. In one embodiment, MSET algorithms yield superior results in comparison to other ML Anomaly Detection Algorithms.

In one embodiment, EMI fingerprinting service 105 may be implemented as a service on cloud infrastructure. In one embodiment, EMI fingerprinting service 105 may be hosted by a dedicated third party, for example in an infrastructure-as-a-service (IAAS), platform-as-a-service (PAAS), or software-as-a-service (SAAS) architecture. In one embodiment, EMI fingerprinting service 105 may be implemented on on-premises infrastructure, such as a set of one or more dedicated servers.

In one embodiment, EMI fingerprinting service 105 may be hosted by a third party, and/or operated by a third party for the benefit of multiple account owners/tenants, each of whom is operating a business, and each of whom has an associated enterprise network 115. In one embodiment, either of EMI fingerprinting service 105 and enterprise network 115 may be associated with discrete business entities. In one embodiment, EMI fingerprinting service 105 is configured with logic, such as software modules, to operate the EMI fingerprinting service 105 to detect passive spychips through polarizability and advanced pattern recognition in accordance with the systems and methods described herein.

In one embodiment, data store(s) 129 includes one or more databases (such as time-series databases or signal databases) or other data structures configured to store and serve time series data representing one or more scans taken by polarizability spychip scanner 110. The time series data may consist of EMI amplitude values sensed in one or more frequency bins at regular intervals (or observations) and stored in association with both the frequency bin and the observation at which the value was sensed. In one embodiment, the time-series database is an Oracle® database configured to store and serve time-series data. In one embodiment, data store(s) 129 may also include one or more relational databases, which may be used to store test sequence library 135 and trained ML model library 139. In some example configurations, data store(s) 129 may be implemented using one or more Oracle® Exadata compute shapes, network-attached storage (NAS) devices and/or other dedicated server device. API calls may include queries against databases. Depending on the type of target database in data store 129, queries may be composed in SQL and executed in a SQL runtime, or use other appropriate query languages and environments, for example a not-only SQL (NOSQL) query language and runtime specific to time-series databases.

In one embodiment, polarizability spychip scanner 110 is a mobile device (such as mobile device 151) or computer (such as computers 145, 147, and 149) coupled with a radio transceiver and appropriate antennae. In one embodiment, polarizability spychip scanner 110 includes a polarizability-based passive spychip scan control components 155, radio 157, network interface 159, and other local computing components 161 such as local storage. Radio 157 further includes transmitter 163 operably connected to transmission antenna (Tx) 165 and receiver 167 operably connected to reception antenna (Rx) 169.

In one embodiment, polarizability-based passive spychip scan control components 155 are configured to cause polarizability spychip scanner 110 perform a passive spychip scan by causing transmitter 163 to transmit electromagnetic energy 171 at designated frequencies and monitoring EMI 175 received by receiver 167 from a target device 173 (such as a unit under test (UUT) or golden system) while target electronic device 173 executes a test sequence, for example as shown and described in further detail herein. Spychip scanner 110 thus induces a magnetic field in passive component(s) of the target electronic system while the target electronic system is emitting a test sequence of dynamic electromagnetic interference (EMI) with a regular dynamic period. The emitted EMI is dynamic in the sense that it changes in amplitude over time. The regular dynamic period is a time interval at which a pattern of amplitude changes in the emitted EMI repeats. From the EMI 175 received by receiver 167, polarizability-based passive spychip scan control components 155 generates a time series of measurements of a combined magnetic field strength of the induced magnetic field from the passive component(s) and the dynamic electromagnetic interference caused by the test sequence. The time series of measurements collects values across a frequency spectrum sensed by receiver 167 and multiple observations over a time period of a test or scan. Target electronic device 173 may be any type of computing device, such as a server, personal computer, mobile device, firewall, router, switch, or other computing device which may be susceptible to insertion of a passive spychip.

In one embodiment, radio 157 is a radio transceiver (or combined radio transmitter and receiver) that can simultaneously both transmit and receive electromagnetic energy. In one embodiment, radio 157 is a software-defined radio (SDR) transceiver including a local oscillator (such as a crystal oscillator) a frequency synthesizer (such as a phase-locked loop frequency synthesizer) to generate frequencies from multiples of the oscillations of the local oscillator, and other radio front end hardware components. In one embodiment, radio 157 is two discrete SDR units, one SDR unit configured to operate in transmit mode and serving as transmitter 163, and one SDR unit configured to operate in receive mode and serving as receiver 167. In one embodiment, polarizability-based passive spychip scan control 155 is configured to generate a digital data stream and convert it to analog signal for transmission by radio 157 transmitter 163 as the electromagnetic energy 171. In one embodiment, polarizability-based passive spychip scan control 155 is configured to convert analog EMI 175 collected by radio 157 receiver 167 to a digital data stream for storage as time series data, either in local storage of polarizability spychip scanner 110, or in data stores 129 of EMI fingerprinting service 105. In one embodiment, the digital values of the EMI 175 collected by radio 157 receiver 167 are stored as discrete observations in a time series data structure, such as a time series database. In one embodiment, transmission antenna (Tx) 165 and reception antenna (Rx) 169 are coils arranged to form inferential magnetic sensors, for example as shown and described in further detail herein.

In one embodiment, network interface 159 is configured to enable polarizability spychip scanner 110 to interact with EMI fingerprinting service 105 or one or more other remote computers over communications network 120. In one embodiment, polarizability spychip scanner 110 may send requests to and receive responses from web servers such as web interface server 127. In one embodiment, web interface server 127 is configured to enable polarizability spychip scanner 110 to access resources provided by EMI fingerprinting service 105. In one embodiment, the analysis of passive spychip scan data is performed by advanced pattern recognition components 133 in response to a request from polarizability spychip scanner 110, and the results are returned to polarizability spychip scanner 110 for display to the user. In another embodiment, the analysis of passive spychip scan data is performed locally by polarizability spychip scanner 110.

In one embodiment, other local computing components 161 include local storage device(s), display(s) for showing text outputs or GUIs, processors, memory or other components of a computing device (such as shown and described with reference to computing system 600).

In one embodiment, enterprise network 115 is a network of one or more computers associated with an entity (such as a business entity) that is authorized to access EMI fingerprinting service 105. For simplicity and clarity of explanation, enterprise network 115 is represented by an on-site local area network 143 to which one or more personal computers 145, or servers 147 are operably connected, along with one or more remote user computers 149 or mobile devices 151 that are connected to the enterprise network 115 through the network 120 or other suitable communications network or combination of networks. The personal computers 145, remote user computers 149, and mobile devices 151 can be, for example, a desktop computer, laptop computer, tablet computer, smartphone, or other device having the ability to connect to local area network 143 or network 120 or having other synchronization capabilities. The computers of the enterprise network 115 interface with EMI fingerprinting service 105 across the network 120 or another suitable communications network or combination of networks.

In one embodiment, remote computing systems (such as polarizability spychip scanner 110 or the computing systems of enterprise network 115) may access information or applications provided by EMI fingerprinting service 105 through web interface server 127. For example, polarizability scanner 110 or computers 145, 147, 149, and 151 of the enterprise network 115 may access polarizability-based passive spychip detection components 125 from EMI fingerprinting service 105. In one embodiment, the remote computing system may send requests to and receive responses from web interface server 127. In one example, access to information or applications of EMI fingerprinting service 105 may be effected through use of a web browser executed by a computing device. For example, these computing devices 145, 147, 149, and 151 of enterprise network 115 may request and receive a web-page-based graphical user interface (GUI) for accessing results of spychip scan analyses from advanced pattern recognition components 133, downloading test sequences from test sequence library 135, or otherwise executing commands to access or configure components of polarizability-based passive spychip detection components 125. In one example, access to information or applications of EMI fingerprinting service 105 may be effected through use of a dedicated software application. For example, polarizability spychip scanner 110 may include software application modules to transmit polarizability scan information to advanced pattern recognition components 133 and receive in return electronic alerts indicating the presence or absence of spychips in a scanned target electronic device 173, along with other software application modules to access or configure components of polarizability-based passive spychip detection components 125. In one example, these communications may be exchanged through web interface server 127 and may take the form of remote representational state transfer (REST) requests using JavaScript object notation (JSON) as the data interchange format for example, or simple object access protocol (SOAP) requests to and from XML servers.

In one embodiment, the components (including subcomponents) of system 100 intercommunicate by electronic messages, signals, or alerts. These electronic messages, signals, or alerts may be configured as calls to functions or procedures that access the features or data of the component, such as for example application programming interface (API) calls. In one embodiment, these electronic messages, signals, or alerts are sent between hosts in a format compatible with transmission control protocol/Internet protocol (TCP/IP) or other computer networking protocol. Components of system 100 may (i) generate or compose an electronic message, signal, or alert to issue a command or request to another component, (ii) transmit the message or signal to other components using the infrastructure of system 100 and (iii) parse the content of an electronic message, signal, or alert received to identify commands or requests that the component can perform, and in response to identifying the command, the component will automatically perform the command or request.

—Leveraging Polarizability for Passive Component Detection—

The systems and methods described herein for passive spychip detection through polarizability and advanced pattern recognition introduce a detection approach that leverages the phenomenon of polarizability to detect passive malicious electronic components (such as spychips) that are not always active. As used herein, the term "polarizability" refers to the tendency of matter to acquire an induced dipole moment in proportion to an applied electromagnetic field. Different materials acquire different dipole moments in response to the same applied electromagnetic field. For example, when two objects with different materials (thus different polarizabilities) are put into the electromagnetic fields, the polarizability responses are expected to be different. Polarizability can be characterized by the induced voltage eddy currents and the strength of the magnetic fields.

In one embodiment, detection of objects using polarizability works by having two coils, a transmission coil (Tx) that transmits a range of frequencies, and a receiving coil (Rx) that detects "back scatter" frequencies. In one example arrangement, the coils are concentric, and the smaller inner coil is the transmission coil (Tx) while the larger outer coil is the receiving coil. Back scatter is a physical property of all matter, yielding distinct (but complex) responses in electromagnetic fields. The received back scatter frequencies carry information that can be used to determine the presence, and even the type, of passive objects. The systems and methods described herein for passive spychip detection through polarizability and advanced pattern recognition induces a back scatter EMI response from passive spychips in electronic devices, and then detects and analyzes that response.

Polarizability has seen application for detection of small, passive (that is, having no active circuitry and generating no EMI emissions) objects in common metal detectors which can, for example, detect coins in the electromagnetically quiet sand of a beach. But, a common metal detector is not able to detect the presence (or certify the absence) of a passive or non-emitting object (such as a spychip) against an EMI "photon chaos" ambient background caused by many dozens of dynamically emitting components. Such an EMI photon chaos occurs in complex computing devices such as enterprise servers, which can have multiple distributed CPU or GPU cores, dozens of dual in-line memory modules (DIMM), solid state drives (SSD) or spinning hard drive disks (HDD), peripheral component interconnect express (PCIE) cards, and application-specific integrated circuits (ASIC). No metal detector can detect a coin or any other component (such as a spychip) in such an EMI photon chaos. Accordingly, the induced back scatter response from the passive spychip is lost in the EMI photon chaos and undetectable without the systems and methods described herein.

In one embodiment, the systems and methods described herein for passive spychip detection through polarizability and advanced pattern recognition overcome these and other challenges by application of a novel frequency-domain to time-domain transformation, analysis of the transformed time-series signals with an advanced pattern recognition machine learning (ML) algorithm trained on a golden system certified to contain no spychips. In one embodiment, the ML algorithm is a multivariate state estimation technique (MSET) algorithm. Where the ML algorithm detects a change in the complex photon chaos inside an operating electronic device in comparison with the golden system, the possible presence of a passive spychip may be inferred. Where no change to the complex photon chaos inside the operating electronic device in comparison with the golden system is detected by the ML algorithm, the absence of any passive object may be used to certify the absence of passive spychips.

More particularly, the challenge presented by the photon chaos is overcome by temporarily creating a controlled chaos in the in the very large and very dynamic ambient radiofrequency background (EMI). This ambient background EMI is detected in a golden system (an electronic device certified to be free of spychips) that is in operation. A frequency-domain to time-domain transformation is applied to the detected EMI to produce binned-frequency time series that are consumable by the advanced pattern recognition ML algorithm. The resulting binned-frequency time series and systemically varying ambient background are used to apply polarizability first to the golden system (to generate training data with which the ML algorithm is trained) and then to units under test of the same make and model as the golden system (to generate test data that can be evaluated by the trained ML algorithm to determine the presence or absence of spychips). The absence of any perturbation detected by the ML algorithm in the systematically controlled ambient background is inferred to certify the absence of a SpyChip, and the presence of a perturbation detected by the ML algorithm in the complex ambient electronic field acts as a trigger to actuate an alarm or alert for a "Suspect SpyChip" detection. This electronic alert may generate an urgent service request for that unit under test to be examined by a service and/or security engineer.

Thus, in one embodiment, the systems and methods described herein for passive spychip detection through polarizability and advanced pattern recognition leverage polarizability with a systematic dynamic ambient-background-generation script and a frequency-domain to time-domain transformation to create frequency-bin time series that are fed into an advanced pattern recognition ML algorithm (such as MSET) that is trained on a golden system and then usable to evaluate an unlimited number of similar make and model units under test for which the induced 3D EMI fingerprints are systematically compared with the golden system fingerprints to certify the absence of passive (non-emitting) spychips or to actuate a "suspected spychip" alarm if any spychips are detected.

—Example Polarization Detection Scenarios—

Figure 2A:
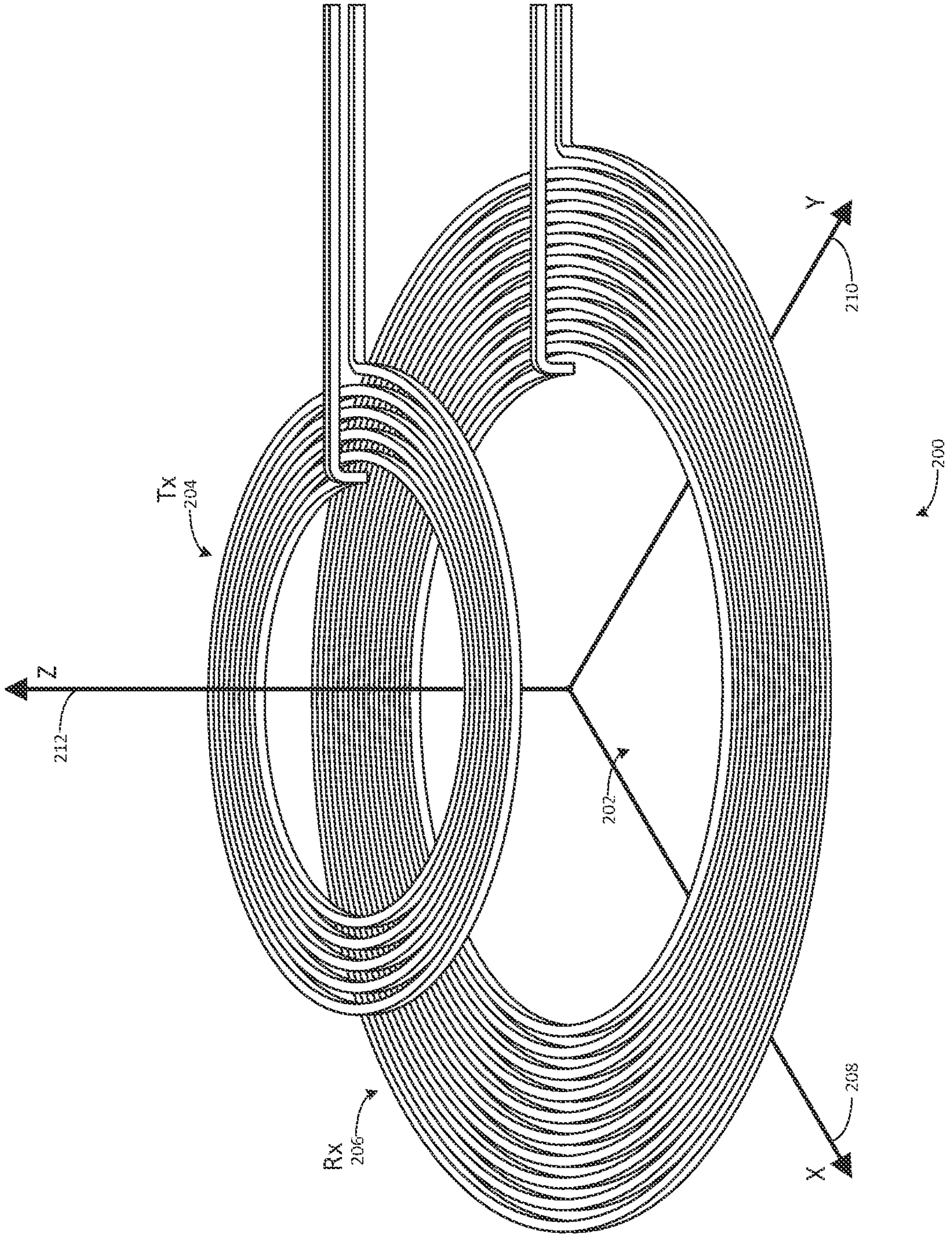
FIG. 2A illustrates one embodiment of inferential magnetic sensors associated with passive spychip detection through polarizability and advanced pattern recognition applied in a base detection scenario of scanning empty space.

FIG. 2A illustrates one embodiment of inferential magnetic sensors 200 associated with passive spychip detection through monitoring induced magnetic field (due to polarizability) against dynamic EMI with advanced ML pattern recognition applied in a base detection scenario (Scenario I) of scanning empty space 202. In one embodiment, the inferential magnetic sensors include two miniature loop coils: one transmitting coil (Tx) 204 at top and one receiving coil (Rx) 206 at bottom. The example arrangement of the loop coils is shown in a three-dimensional (3D) magnetic space relative to an X-axis 208, a Y-axis 210, and a Z-axis 212. Receiving coil 206 has 10 turns, and is situated on the plane defined by X-axis 208 and Y-axis 210, centered on Z-axis 212 at (0, 0, 0) millimeters. In one embodiment, receiving coil 206 is used as reception antenna (Rx) 169 of polarizability spychip scanner 110. Transmitting coil 204 has 5 turns, and is situated in a plane above and parallel to the plane defined by X-axis 208 and Y-axis 210, for example centered on Z-axis 212 at (0, 0, 15) millimeters. In one embodiment, transmitting coil 204 is used as transmission antenna (Tx) 165 of polarizability spychip scanner 110.

A small eddy current may be added to transmitting coil 204 to induce magnetic fields around transmitting coil 204 and receiving coil 206. When a metal object is put into the magnetic fields generated by the loop coils 204 and 206, it will induce a secondary magnetic field. Therefore, the overall magnetic field is influenced by both primary and secondary fields. As a result, a change in the magnetic fields can be leveraged for detecting the presence of the object. This example inferential magnetic sensor configuration is used in each of six example detection scenarios described below that illustrate the ability of the systems and methods described herein to distinguish between the absence and presence of a passive non-emitting object, and even the presence of two different objects.

Figure 3:
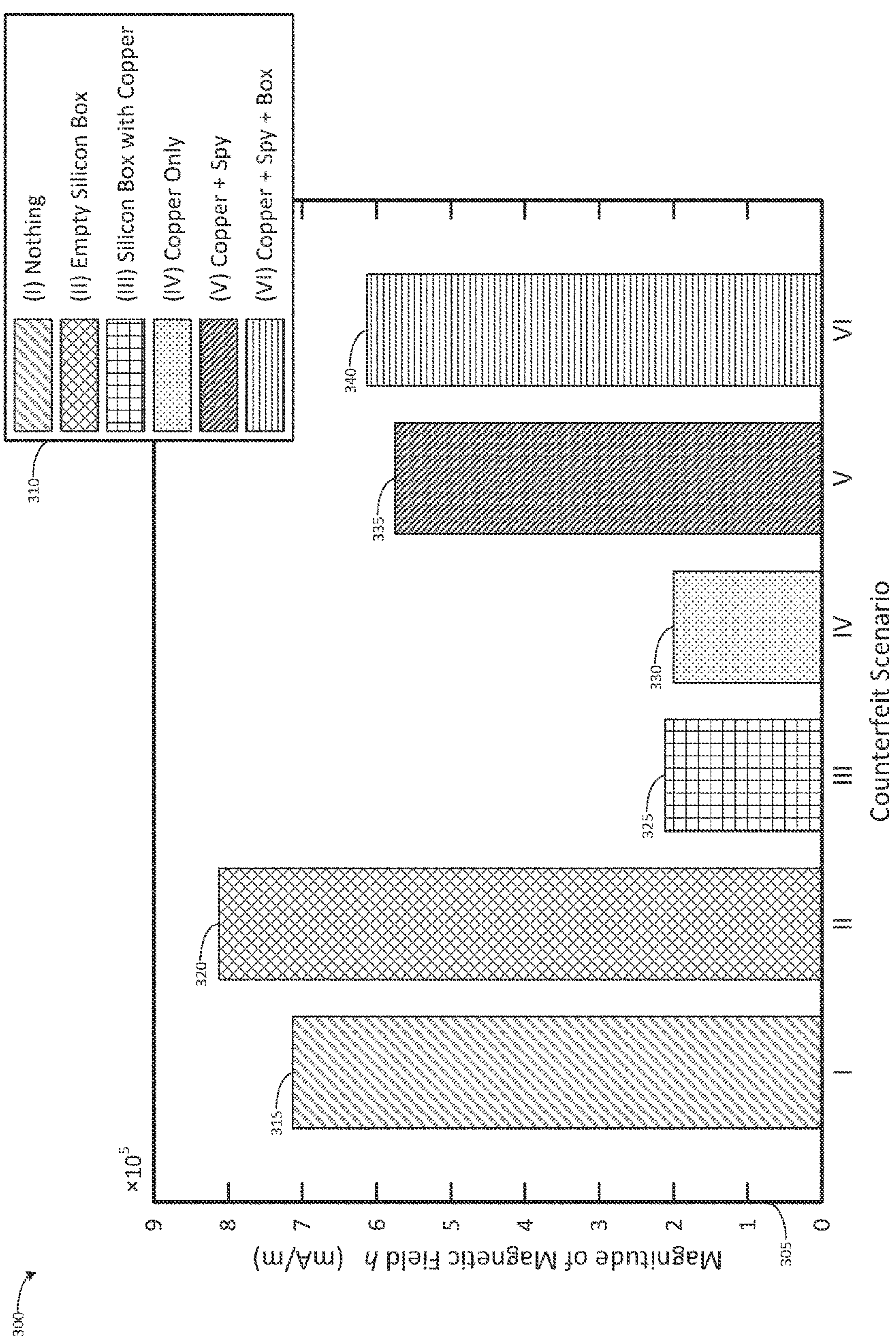
FIG. 3 illustrates an example bar chart of magnetic field strengths detected in each of the detection scenarios shown and described with reference to FIGS. 2A-2F associated with one embodiment of passive spychip detection through polarizability and advanced pattern recognition.

In each of the six example spychip detection use cases discussed below, a 1 ampere excitation (eddy) current is added to the transmitting coil 204. No current is added to the receiving coil 206. The resulting magnitude of the overall magnetic field in each scenario is shown in FIG. 3. Scenario I is shown in FIG. 2A, and is a base scenario where nothing (empty space 202) other than loop coils 204 and 206 are in the space.

Figure 2B:
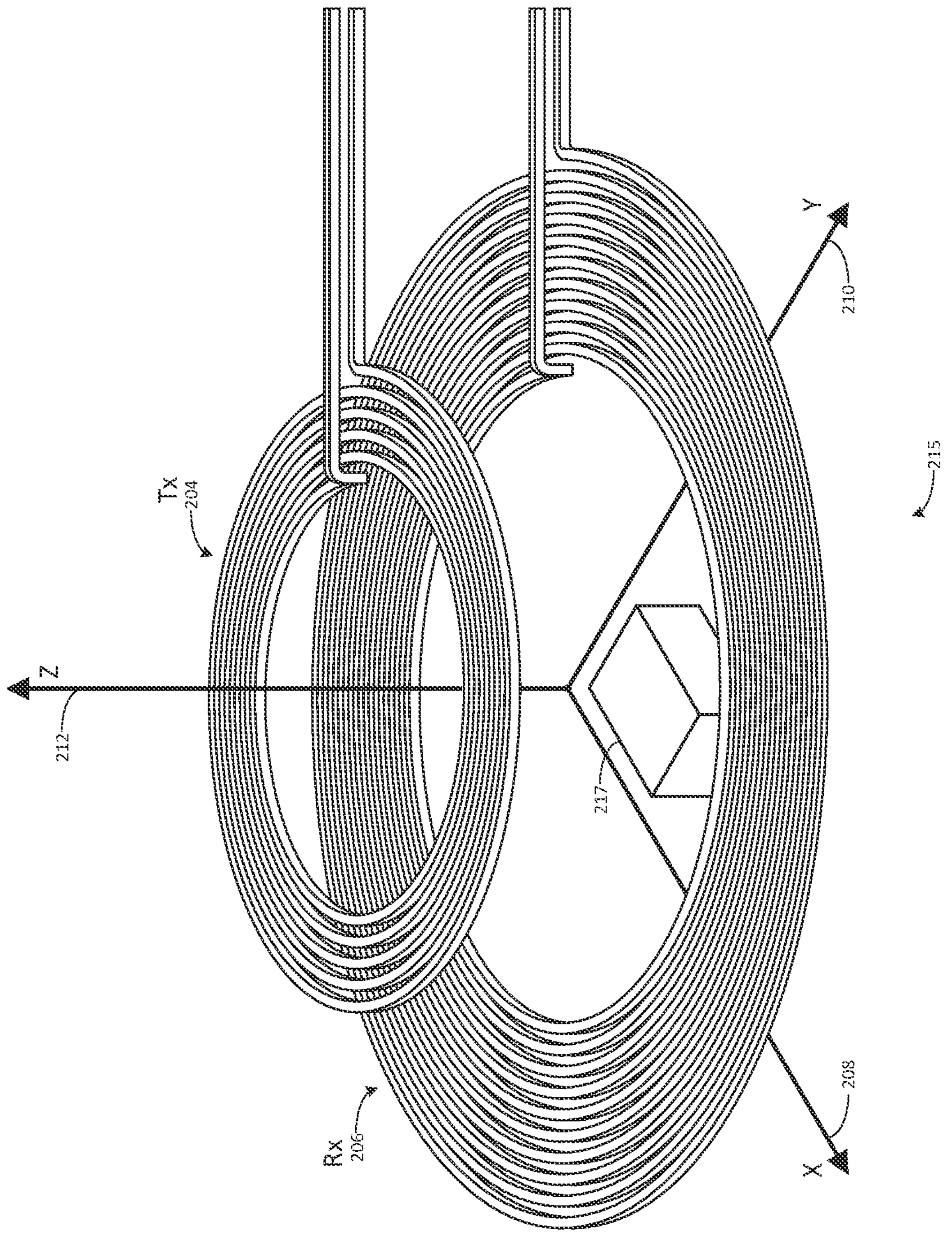
FIG. 2B illustrates one embodiment of inferential magnetic sensors associated with passive spychip detection through polarizability and advanced pattern recognition applied in a detection scenario of scanning an empty silicon box.

FIG. 2B illustrates one embodiment of inferential magnetic sensors 215 associated with passive spychip detection through monitoring induced magnetic field (due to polarizability) against dynamic EMI with advanced ML pattern recognition applied in a detection scenario (Scenario II) of scanning an empty silicon box 217. For example, empty silicon box 217 may be placed below the plane defined by X-axis 208 and Y-axis 210, centered on the Z-axis 212 at approximately (0, 0, −5) millimeters.

Figure 2C:
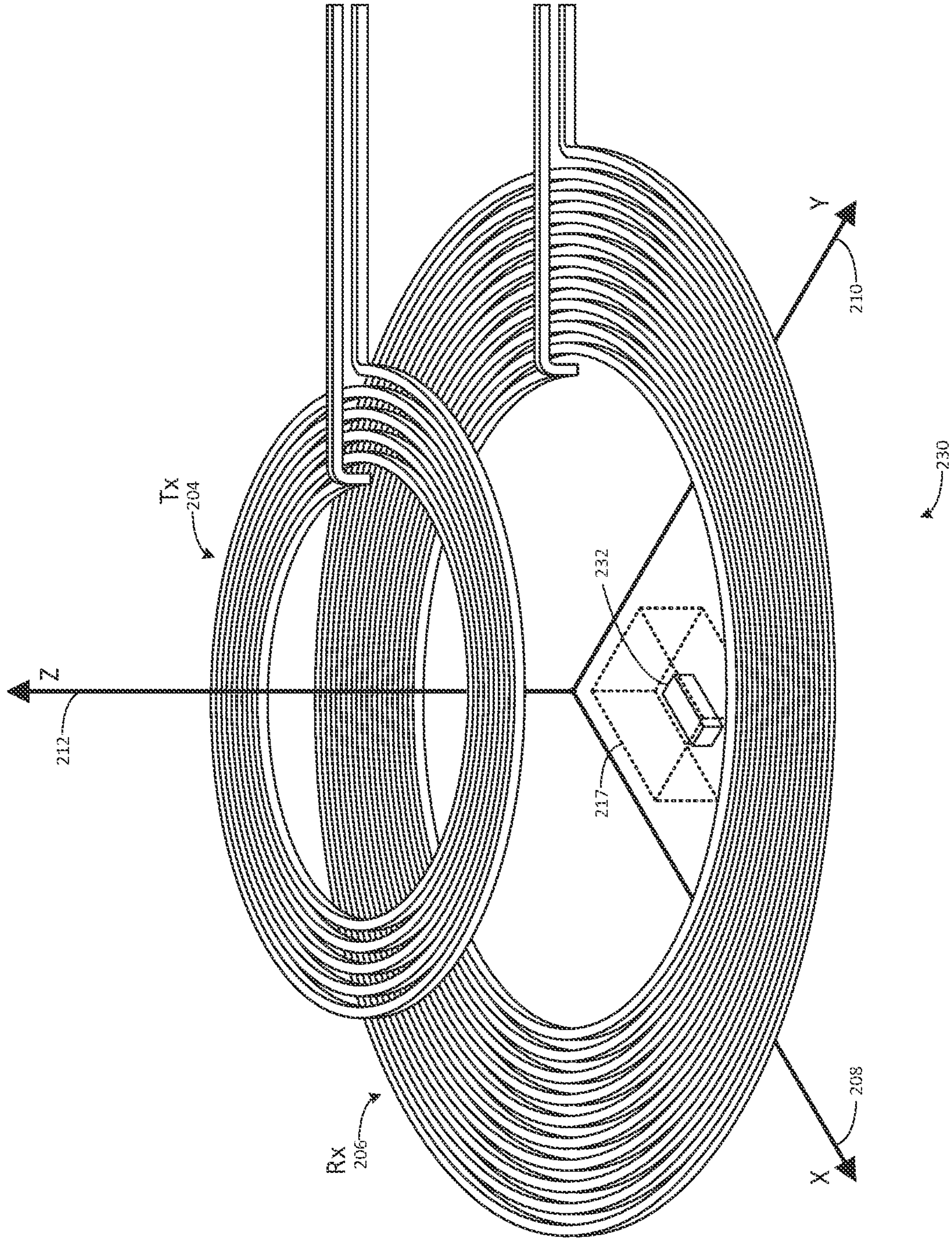
FIG. 2C illustrates one embodiment of inferential magnetic sensors associated with passive spychip detection through polarizability and advanced pattern recognition applied in a detection scenario of scanning a silicon box enclosing a copper slug.

FIG. 2C illustrates one embodiment of inferential magnetic sensors 230 associated with passive spychip detection through monitoring induced magnetic field (due to polarizability) against dynamic EMI with advanced ML pattern recognition applied in a detection scenario (Scenario III) of scanning the silicon box 217 enclosing a copper slug 232. In Scenario III, copper slug 232 is placed within silicon box 217 near the Z-axis 212.

Figure 2D:
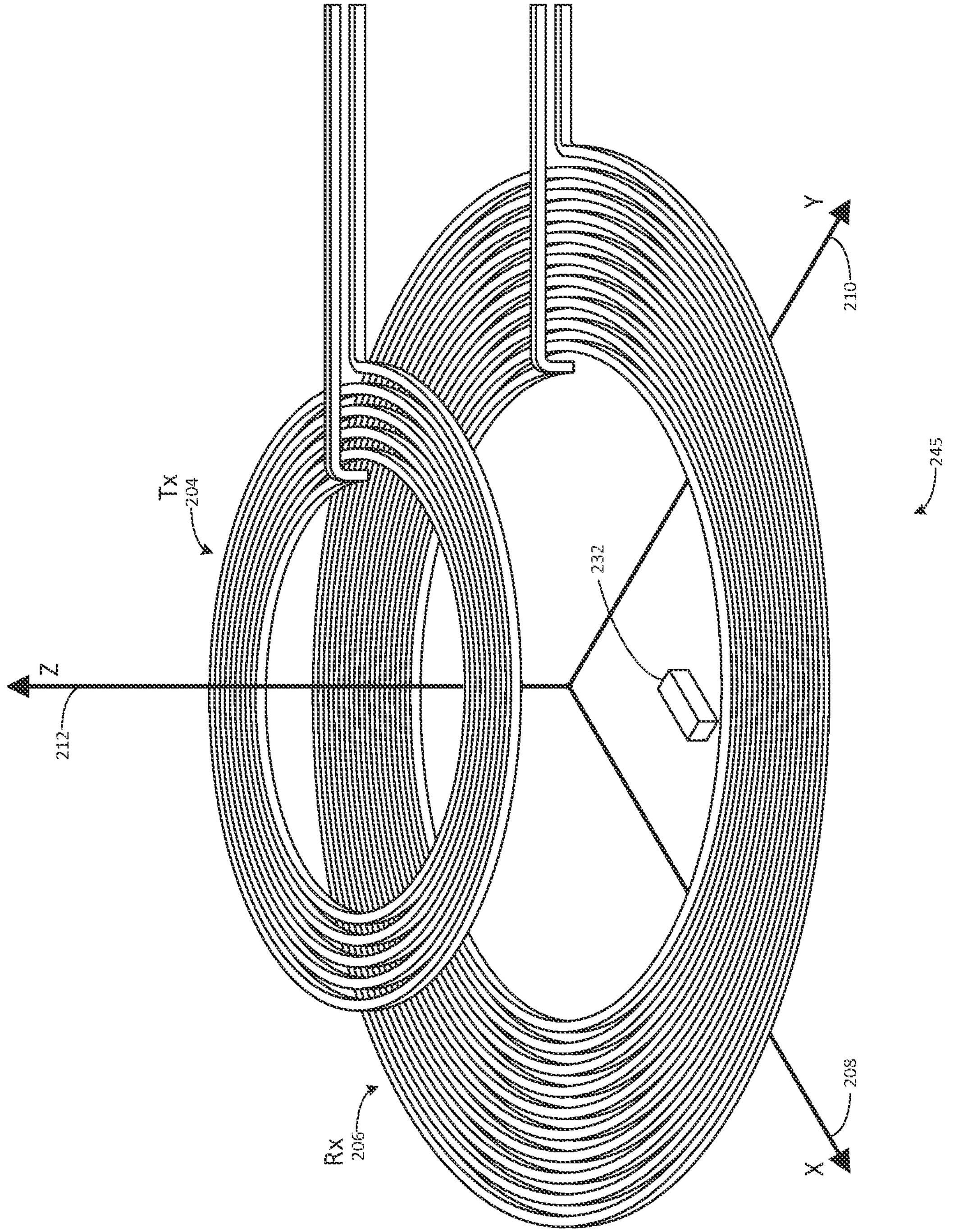
FIG. 2D illustrates one embodiment of inferential magnetic sensors associated with passive spychip detection through polarizability and advanced pattern recognition applied in a detection scenario of scanning a copper slug.

FIG. 2D illustrates one embodiment of inferential magnetic sensors 245 associated with passive spychip detection through monitoring induced magnetic field (due to polarizability) against dynamic EMI with advanced ML pattern recognition applied in a detection scenario (Scenario IV) of scanning the copper slug 232 alone. In Scenario IV, the copper slug 232 is placed into the space alone, without the silicon box 217, in the same location near the Z-axis 212 as in Scenario III.

Figure 2E:
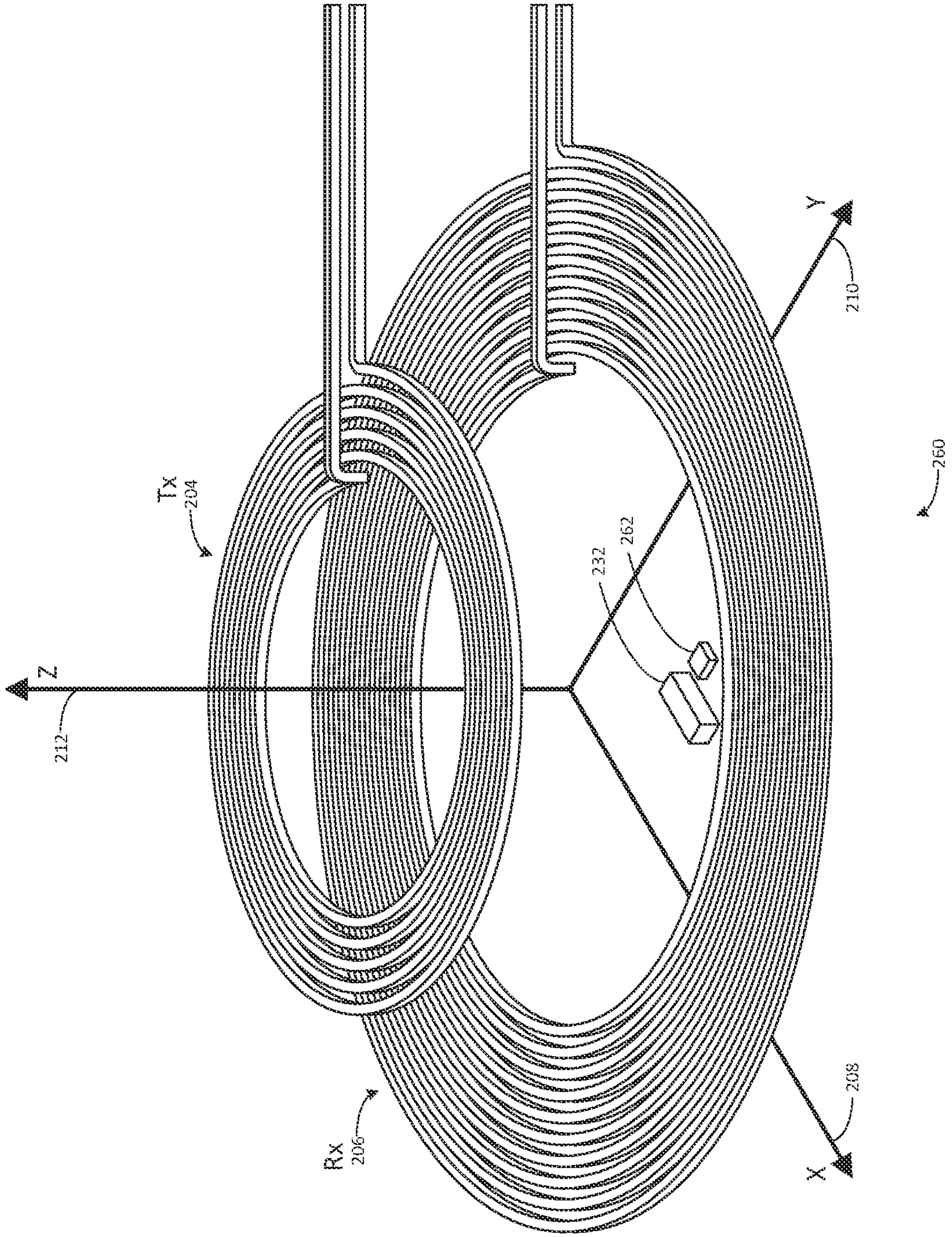
FIG. 2E illustrates one embodiment of inferential magnetic sensors associated with passive spychip detection through polarizability and advanced pattern recognition applied in a detection scenario of scanning a copper slug and a passive spychip.

FIG. 2E illustrates one embodiment of inferential magnetic sensors 260 associated with passive spychip detection through monitoring induced magnetic field (due to polarizability) against dynamic EMI with advanced ML pattern recognition applied in a detection scenario (Scenario V) of scanning the copper slug 232 and a passive spychip 262. In Scenario IV, the copper slug 232 is placed into the space in the same location near the Z-axis 212 as in Scenarios III and IV. A simulated passive spychip 262—a radio frequency identification (RFID) tag chip that may be set to a turned on or turned off state—is also placed into the space in another location near the Z-axis 212.

Figure 2F:
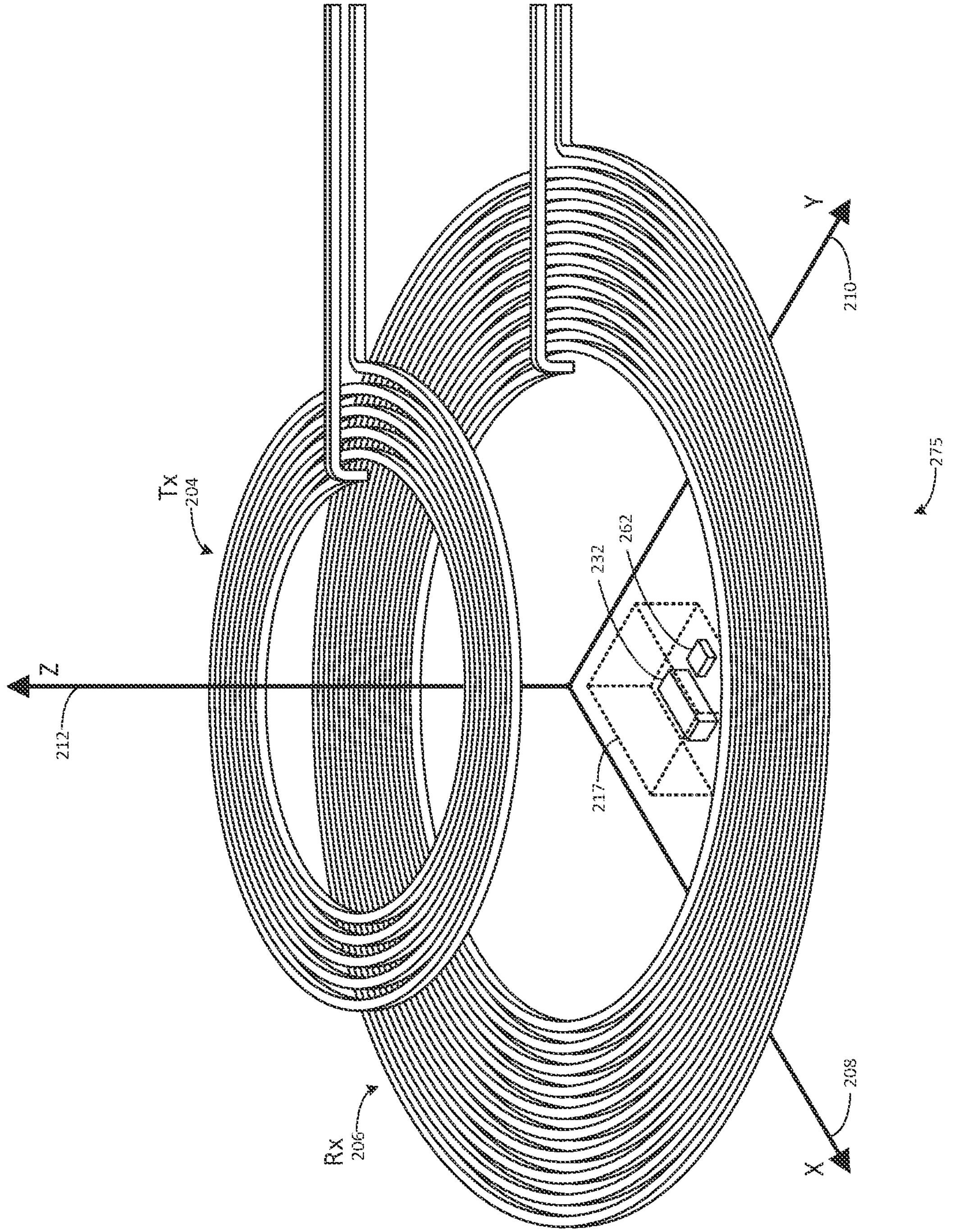
FIG. 2F illustrates one embodiment of inferential magnetic sensors associated with passive spychip detection through polarizability and advanced pattern recognition applied in a detection scenario of scanning a silicon box enclosing a copper slug and a passive spychip.

FIG. 2F illustrates one embodiment of inferential magnetic sensors 275 associated with passive spychip detection through monitoring induced magnetic field (due to polarizability) against dynamic EMI with advanced ML pattern recognition applied in a detection scenario (Scenario VI) of scanning the silicon box 217 enclosing the copper slug 232 and the passive spychip 262. In Scenario VI, the copper slug 232 and passive spychip are placed into the same locations as in Scenario V, and enclosed within silicon box 217.

In Scenarios II, III and VI, the size of the silicon box 217 is 25 mm (X)×10 mm (Y)×5 mm (Z). In Scenarios III, IV, V and VI, the size of the copper rod 232 is 10 mm. In Scenarios V and VI, the RFID chip 262 is 2 mm long and is turned off in order to simulate a spychip in a passive state.

Each of these six scenarios was simulated using Ansys Maxwell, a commercially available electromagnetic field solver, in order to determine the detected magnitude of the overall magnetic field for each scenario. The magnetic field (h) in each of the six spychip detection scenarios described in FIGS. 2A-2F is measured at a 1 MHz measuring frequency. The results are presented in FIG. 3. FIG. 3 illustrates an example bar chart 300 of magnetic field strengths detected in each of the six detection scenarios shown and described with reference to FIGS. 2A-2F associated with one embodiment of passive spychip detection through polarizability and advanced pattern recognition. The bar chart 300 includes a magnitude of magnetic field axis 305 with units given in amperes per meter. A key 310 briefly describes the scenarios represented by each bar in bar chart 300. The detected magnetic field strength under Scenario I 315, a scan of empty space 202, is just over 700,000 milliamperes per meter (mA/m). The detected magnetic field strength under Scenario II 320, a scan of empty silicon box 217, is just over 800,000 mA/m. The detected magnetic field strength under Scenario III 325, a scan of silicon box 217 containing a copper slug 232, is just over 200,000 mA/m. The detected magnetic field strength under Scenario IV 330, a scan of a copper slug 232 by itself, is also approximately 200,000 mA/m. The detected magnetic field strength under Scenario V 335, a scan of a copper slug 232 and passive spychip 262, is just under 600,000 mA/m. The detected magnetic field strength under Scenario VI 340, a scan of a copper slug 232 and passive spychip 262 within silicon box 217, is just over 600,000 mA/m. From these measurements, observe the 3 times difference between Scenarios I-II and Scenarios III-IV, where silicon box 217 is in presence or not. In addition, with different metal objects put into the box, the resulting differences in the magnetic field h are noticeable, as the magnetic field has changed for more than 2 times. In addition, even when the objects are put into a non-metal box, we can still observe such a difference. This analysis illustrates the feasibility of metal detection of passive spychips using polarizability.

—Passive Spychip Detection from Polarizability Response—

In one embodiment, polarizability response (magnetic field strength) is leveraged to achieve passive spychip detection using an advanced pattern recognition technique. In one embodiment, in order to provide a measure of control to the photon chaos of the ambient background EMI of a target asset possessing internal electronic components (such as an enterprise server or other electronic device), a sinusoidal waveform input stimulus is introduced to the target asset. In one embodiment, this is accomplished by causing the electronic device to execute a test sequence that causes the EMI emissions to oscillate in a sinusoidal test pattern. For example, the test sequence configures the target asset (by software or firmware) to run a particular pulse width modulation (PWM) workload in form of a sinusoidal wave, which results in a deterministic waveform ambient background. In other words, the target asset is caused to emit a test pattern of EMI emissions. In this way, a test pattern of regular repeating changes is imposed on the chaotic EMI of the target asset, against which polarizability-induced emissions can be detected. In one embodiment, test sequences for various makes/models of enterprise server and other electronic devices may be stored in test sequence library 135. Other test sequences may be used to run workloads that cause the target electronic device to emit a test pattern of deterministic background EMI having waveforms other than a sinusoidal waveform, such as a square wave, or an irregular (but predetermined) wave pattern. Authorized users and administrators may download a test sequence for a make and model of a particular unit under test, load the test sequence into the unit under test, and cause the test sequence to be executed to cause the asset to generate the test pattern of oscillating deterministic ambient background.

Figure 4A:
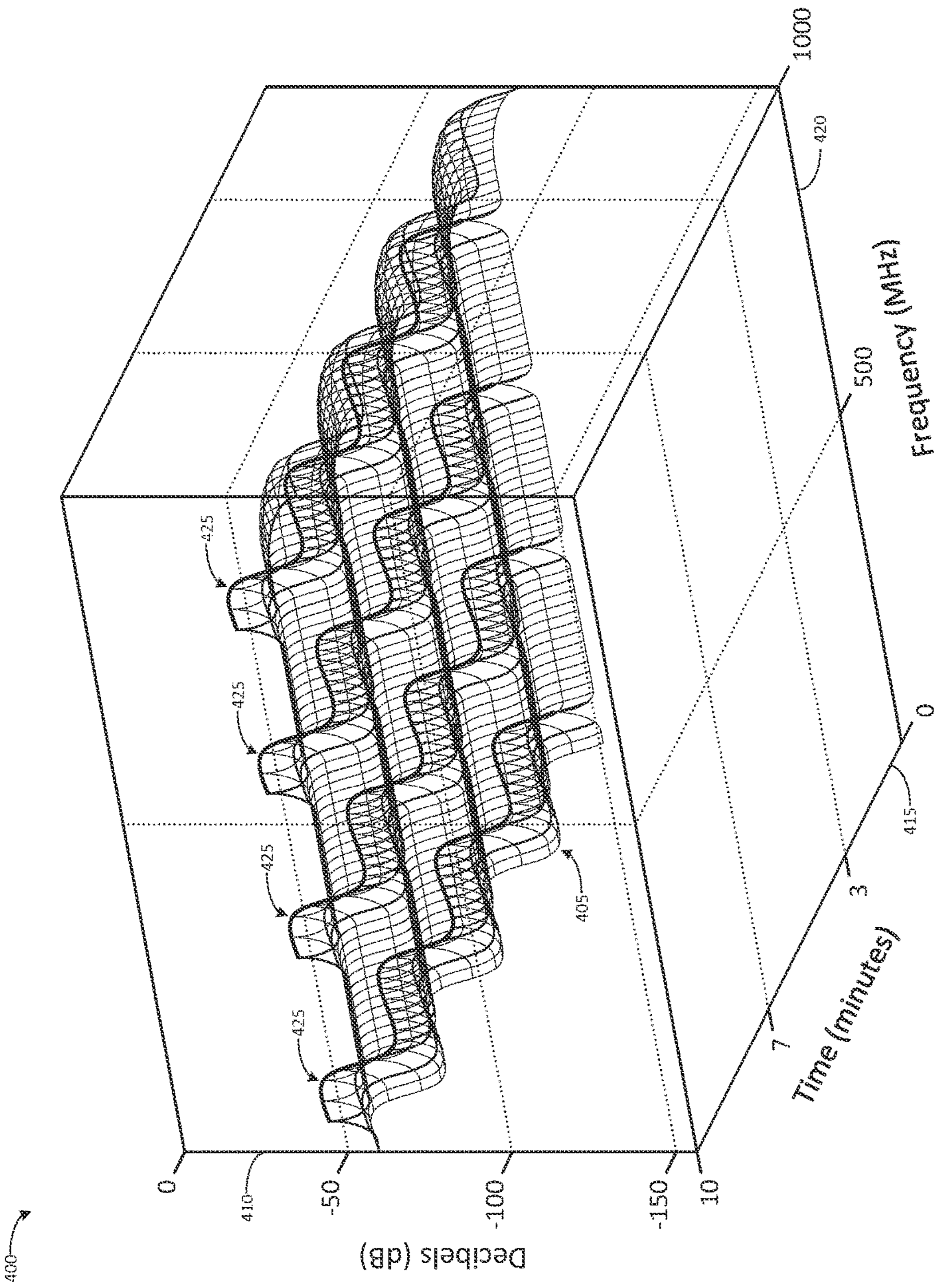
FIG. 4A illustrates an example 3D surface mapping between time, measuring frequency, and polarizability responses (magnetic field measurements) for a golden server that is certified to include no spychips associated with one embodiment of passive spychip detection through polarizability and advanced pattern recognition.

In one embodiment, the Tx antenna 165 and Rx antenna 169 (configured respectively as Tx coil 204 and Rx coil 206) of polarizability spychip scanner 110 are placed within an example enterprise server golden server, and the polarizability spychip scanner 110 continuously measures the magnetic field over a frequency spectrum and a time period. The polarizability spychip scanner 110 thus obtains a time series of magnetic field measurements associated with the frequency spectrum for the golden server. FIG. 4A illustrates an example 3D surface mapping 400 between time, frequency spectrum, and polarizability responses (magnetic field measurements) for a golden server that is certified to include no spychips associated with one embodiment of passive spychip detection through monitoring induced magnetic field (due to polarizability) against dynamic EMI using advanced ML pattern recognition. A 3D surface 405 of an example time series of magnetic field measurements associated with the frequency spectrum for the golden server is plotted against a magnetic field amplitude axis 410 measured in decibels, a time axis 415 measured in minutes, and a frequency axis 420 measured in megahertz. Note that the time series data represented by surface 405 is noisy data, but for simplicity of representation in the figure, surface 405 does not show the noise and instead surface 405 represents the time series data as a smooth wireframe. In this example, the sinusoidal form of the server ambient background (test pattern) driven by the sinusoidal workload of the test sequence is visible in surface 405. The elevated ridges 425 are specific frequencies induced by Tx antenna 165 (Tx coil 204) of polarizability spychip scanner 110, which are superimposed on the sinusoidal ambient background EMI of the server.

Figure 4B:
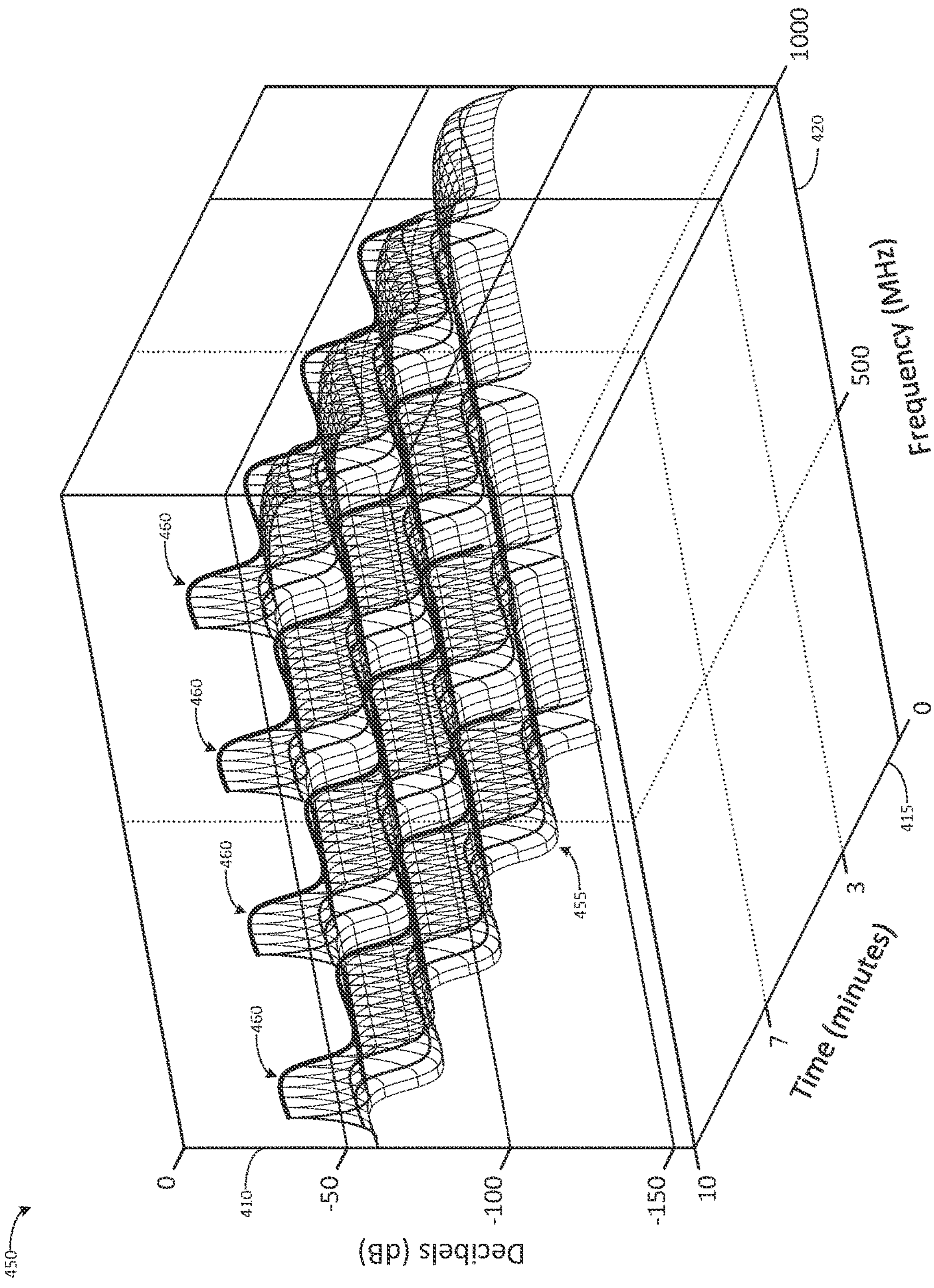
FIG. 4B illustrates an example 3D surface mapping between time, measuring frequency, and polarizability responses (magnetic field measurements) for a compromised server that includes a spychip associated with one embodiment of passive spychip detection through polarizability and advanced pattern recognition.

In one embodiment, the same measurements are performed on a testing server (denoted as "unit under test") of the same make/model as the golden server. The Tx antenna 165 and Rx antenna 169 (configured respectively as Tx coil 204 and Rx coil 206) of polarizability spychip scanner 110 are placed within a unit under test that is compromised by inclusion of a passive spychip, and the polarizability spychip scanner 110 continuously measures the magnetic field over a frequency spectrum and a time period. In one embodiment, the measuring frequency (or sampling rate) is fixed, for example at 1 MHz. The polarizability spychip scanner 110 thus obtains a time series of magnetic field measurements associated with the frequency spectrum for the unit under test. Because a passive spychip exists in the unit under test, a different mapping occurs between the magnetic field measurements and frequency spectrum, as seen in FIG. 4B. FIG. 4B illustrates an example 3D surface mapping 450 between time, frequency spectrum, and polarizability responses (magnetic field measurements) for a compromised server that includes a passive spychip associated with one embodiment of passive spychip detection through monitoring induced magnetic field (due to polarizability) against dynamic EMI with advanced ML pattern recognition. A 3D surface 405 of an example time series of magnetic field measurements associated with the frequency spectrum for the compromised server is plotted against magnetic field amplitude axis 410, time axis 415, and frequency axis 420. As above, the time series data represented by surface 455 is noisy data, but for simplicity of representation in the figure, surface 455 does not show the noise and instead surface 455 represents the time series data as a smooth wireframe. The polarizability perturbation caused by the presence of the spychip can be observed with the higher ridges 460 superimposed on the sinusoidal ambient background EMI of the server at the frequencies induced by Tx antenna 165 (Tx coil 204) when compared with ridges 425 of FIG. 4A.

Although the example surfaces 405 and 455 are visually different, this is an example case shown for purposes of explanation, and the distinctions between magnetic field measurements over frequency spectrum and time period between golden and compromised servers may be more subtle. Advanced pattern recognition is therefore applied to determine whether the differences are anomalous. In one embodiment, polarizability spychip scanner 110 has collected the time series of magnetic field measurements associated with the frequency spectrum for the unit under test, and stored it in local storage. In one embodiment, polarizability-based passive spychip scan control 155 generates instructions that transmit the collected time series of magnetic field measurements to advanced pattern recognition components 133 of polarizability-based passive spychip detection components 125 in EMI fingerprinting service 105, and further request the performance of ML predictive analytics using an ML model trained on a golden server of the same make and model of the unit under test to distinguish between the presence and absence of unknown electronic components such as spychips in the unit under test.

In response to the request from polarizability spychip scanner 110, advanced pattern recognition components 133 present the time series of magnetic field measurements associated with the frequency spectrum for the unit under test to domain transformation modules 142 for performance of a frequency-domain to time-domain transformation. In one embodiment, to effect the frequency-domain to time-domain transformation, domain transformation modules 142 divides the frequency spectrum for the unit under test into a set of frequency bins, or contiguous ranges of the frequency spectrum. In one embodiment, the frequency bins may be of even breadth. For example, the frequency spectrum from 0 to 1000 MHz may be divided into 20 bins 50 MHz wide, such as 1-50 MHz, 51-100 MHz, . . . 901-950 MHz, and 951-1000 MHz. Higher or lower numbers of frequency bins are permitted. As few as 5 frequency bins or as many as 100 bins may be used, but practical experience has found 20 bins to be satisfactory. Each of the frequency bins traces out a discrete time series signal of magnetic field measurements over time. Each frequency bin may be represented by a single frequency within the bin, for example the frequency in the bin that has the highest peaks.

A set of some or all of the bins may then be selected as inputs to the machine learning anomaly detection model executed by ML predictive analytics 137. While frequency bins may be selected arbitrarily when initially training a machine learning anomaly detection model, the frequency bins selected for the unit under test are the same frequency bins as are used for the frequency spectrum of the golden server of the same make and model as the unit under test. That is, the trained model tests on the same frequency bins that it was trained on. Where the unit under test has one or more non-emitting devices (such as passive spychips) inside, there should be multiple anomaly alarms on the signals due to the difference between ML model estimates and measured values, indicating there is a passive device in the unit under test that was not present when collecting the measurements from the golden system. In response to this result, polarizability-based passive spychip detection components 125 may compose and transmit an electronic message to an email or other message address of an authorized technician or administrator alerting the recipient to the suspected presence of a passive spychip. Where the unit under test has no non-emitting devices (such as passive spychips) inside there should be no anomaly alarms.

The domain transform and anomaly analysis are completed practically in real time, and an electronic alert or message indicating the status of the unit under test may be transmitted back to polarizability spychip scanner 110 to cause the results to be displayed to the user of spychip scanner 110 practically in real time. In one embodiment, in response to receiving and parsing a message or alert that indicates that no anomaly was found between magnetic field measurements for the unit under test and magnetic field measurements for the golden server, polarizability-based passive spychip scan control 155 causes a graphical notice to be presented on a display component of polarizability spychip scanner that indicates that no passive spychips were detected. The graphical notice may for example, present a green circle and text that reads "Passive Spychip Scan Passed" or words of similar import. In one embodiment, in response to receiving and parsing a message that indicates that anomalies were found between magnetic field measurements for the unit under test and magnetic field measurements for the golden server, polarizability-based passive spychip scan control 155 causes a graphical notice to be presented on a display component of polarizability spychip scanner that indicates that passive spychips may be present. The graphical notice may for example, present a red octagon and text that reads "Passive Spychip Suspected! Do Not Use Unit Under Test" or words of similar import.

EXAMPLE METHOD

In one embodiment, each step of computer-implemented methods described herein may be performed by a processor (such as processor 610 as shown and described with reference to FIG. 6) of one or more computing devices (i) accessing memory (such as memory 615 and/or other computing device components shown and described with reference to FIG. 6) and (ii) configured with logic to cause the system to execute the step of the method (such as polarizability—based passive spychip detection logic 630 shown and described with reference to FIG. 6). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device (such as memory 615, or storage/disks 635 of computing device 605 or remote computers 665 shown and described with reference to FIG. 6, or in data stores 129 shown and described with reference to FIG. 1).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 5:
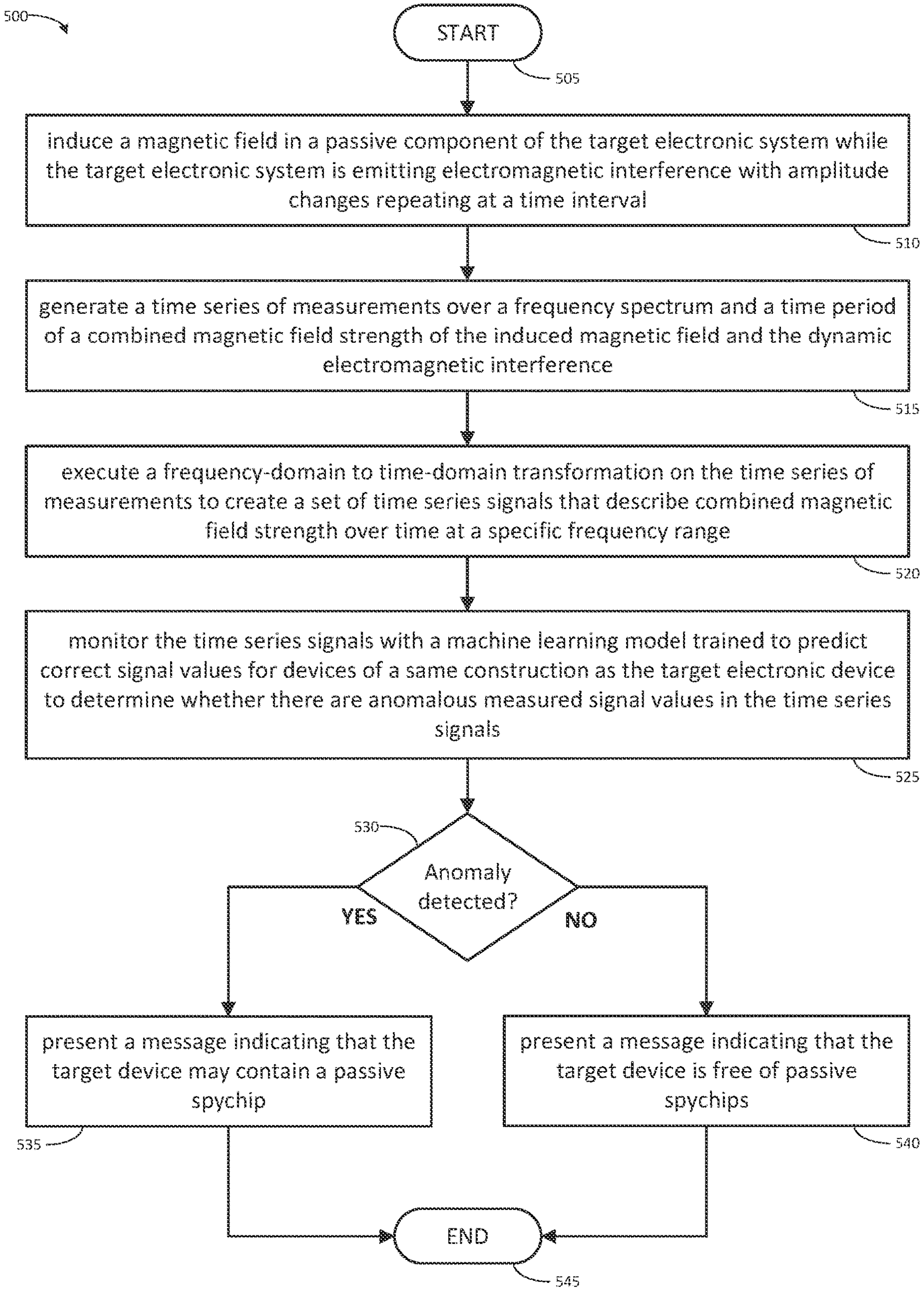
FIG. 5 illustrates one embodiment of a method associated with passive spychip detection through polarizability and advanced pattern recognition.

FIG. 5 illustrates one embodiment of a method 500 associated with passive spychip detection through monitoring induced magnetic field (due to polarizability) against dynamic EMI using advanced ML pattern recognition. In one embodiment, the steps of method 500 are performed by EMI fingerprinting service 105 in conjunction with polarizability spychip scanner 110 (as shown and described with reference to FIG. 1). In one embodiment, polarizability spychip scanner 110 is a special purpose computing device (such as computing device 605) configured with polarizability-based passive spychip detection logic 630. In one embodiment, EMI fingerprinting service 105 is provided by one or more special purpose computing devices configured with logic 630. In one embodiment, EMI fingerprinting service 105 is a module of one or more special purpose computing devices configured with logic 630. In one embodiment, real time EMI detection of passive spychips in electronic devices is enabled by the steps of method 500, where such real time detection of passive spychips was not previously possible to be performed.

The method 500 may be initiated automatically based on various triggers, such as in response to receiving a signal over a network or parsing stored data indicating that (i) a user (or administrator) of polarizability spychip scanner 110 has initiated method 500, (ii) that method 500 is scheduled to be initiated at defined times or time intervals, (iii) that a user (or administrator) of polarizability spychip scanner 110 has begun a scan for passive spychips in a target system, (iv) in response to a completion of an EMI fingerprinting scan for active spychips or counterfeit components in a target system. The method 500 initiates at START block 505 in response to parsing a signal received or stored data retrieved and determining that the signal or stored data indicates that the method 500 should begin. Processing continues to process block 510.

At process block 510, the processor induces a magnetic field in a passive component of the target electronic system while the target electronic system is emitting electromagnetic interference with amplitude changes repeating at a time interval.

In one embodiment the processor generates and sends instructions to the radio 157 transmitter 163 to add an eddy current to the transmission antenna 165 (which may be configured as a transmitting coil). The instruction includes one or more specified frequencies of magnetization to be included in the eddy current. The radio 157 accepts and parses the instructions, and configures and activates transmitter 163 to apply the eddy (or excitation) current to the transmission antenna 165, thereby generating a primary magnetic field. Secondary magnetic fields are induced in passive components of the target electronic device 173 by the primary magnetic field. In this way, induction of the magnetic field in the passive component(s) of the target device includes adding an eddy current having one or more specified frequencies of magnetization to the transmitting coil by the radio transmitter.

For purposes of detecting the induced magnetic fields from passive components, the active components of target electronic device 173 should be operated so as to emit dynamic (varying in amplitude) EMI with a regular (or consistently repeating) dynamic period during the induction of the magnetic fields. This provides a deterministic (that is, a predictable) ambient background against which induced magnetic fields and back scatter may be detected. In one embodiment, the target electronic system 173 is executing a waveform workload to cause the target electronic system to emit the dynamic electromagnetic interference. In one embodiment, the emitted dynamic electromagnetic interference has a regular dynamic period, that is, the amplitude of the EMI is changed in a pattern that repeats at a time interval. For example, the waveform may be a sinusoidal waveform generated by pulse width modulation, or, in some cases, a simple power-on, power-off square wave with a regular cycle. The regular dynamic period of the dynamic EMI has the same period of time as the waveform workload. Thus, in one embodiment, the test pattern is a repeating pattern.

In one embodiment, the transmission antenna 165 (transmission coil) is positioned proximate to the target electronic system. As used herein, a target electronic system may refer to a unit under test or a golden system. Generally, a position "proximate" to the target electronic system means within a few feet or inches of the target electronic system Note that the transmission antenna 165 when configured as a transmission coil 204 is a few centimeters in diameter. Accordingly, a position "proximate" to the target electronic system may even be inside a housing enclosure of the target electronic system, and such a position may be desirable to increase reception of signals.

Once the processor has thus completed inducing a magnetic field in a passive component of the target electronic system while the target electronic system is emitting electromagnetic interference with amplitude changes repeating at a time interval, processing at process block 510 completes, and processing continues to process block 515.

At process block 515, the processor generates a time series of measurements over a frequency spectrum and a time period of a combined magnetic field strength of the induced magnetic field and the dynamic electromagnetic interference. In other words, the processor takes measurements of combined electromagnetic field strength emitted by the target electronic system while the electromagnetic field is being applied and the target electronic system is emitting a test pattern of electromagnetic interference.

In one embodiment, the receiving antenna 169 is influenced by the combined magnetic fields including the induced magnetic fields of passive components of the target electronic device and the dynamic EMI background. In one embodiment, the receiving antenna 169 (which may be configured as a receiving coil) is positioned proximate to the target system. The influences on the receiving antenna 169 are processed into analog signals, for example by receiver 167. Software defined radio 157 generates digital signal amplitude values for each frequency in a set of discrete frequencies across the frequency spectrum from the analog signals. In this way, the generation of the time series of measurements includes detecting the combined magnetic field strength by a radio receiver through the receiving coil.

In one embodiment, in order to cause the target electronic system to emit dynamic electromagnetic interference with a regular dynamic period, the target electronic system is executing a waveform workload during the test with the regular dynamic period being the same period as the waveform workload. In one embodiment, the waveform workload is a test sequence such as those described elsewhere herein. Thus, in one embodiment, the target electronic system executes a waveform workload to cause the target electronic system to emit the electromagnetic interference, and wherein the time interval (over which the EMI changes amplitude) is the period of the waveform workload.

The digital signal amplitude values generated by software defined radio 157 are accessible through an interface of radio 157. Polarizability-based spychip scan control 155 samples or observes a set of the digital signal amplitude values at regular observation intervals over a period of time during which polarizability spychip scanner 110 is scanning a unit under test—a scan period—and records the sampled signal values as one observation of a time series for the scan period of measurements over the frequency spectrum of combined magnetic field strength. The observing and recording loop repeats at the regular observation intervals during the scan period. The same set of values is sampled at each observation, thereby recording the digital signal values at a consistent set of signals for each observation. In one embodiment, the interval between observations is one second or less, down to the finest interval producible by polarizability spychip scanner 110. In one embodiment, the scan period is approximately 10 minutes. In one embodiment, the observation is stored as a data structure for an observation in a data structure for a time series. In one embodiment, the sequence of observations is stored in local storage of polarizability spychip scanner 110 until the scan is complete. Following completion of the scan, the polarizability-based passive spychip scan control retrieves the completed time series of the scan, and causes network interface 159 to transmit the time series to EMI fingerprinting service 105 for storage in data store 129 for further processing.

In one embodiment, the frequency spectrum is between 0 megahertz (MHz) and 1 gigahertz (GHz). This may be expanded beyond 1 gigahertz to include an expected response of a passive spychip that is more readily detectable at, or is strongest at, a frequency greater than 1 gigahertz; or conversely, the frequency spectrum may be reduced where expected response of a passive spychip is readily detectable within, or is strongest within, a frequency range smaller than 0 MHz-1 GHz, for example 250 MHz to 750 MHz. In one embodiment, the set of discrete frequencies generated by radio 157 is each integer megahertz value on the frequency spectrum. In one embodiment, the set of discrete frequencies is more granular, for example, the set of discrete frequencies may be every fifth or tenth of a megahertz value along the frequency spectrum. In one embodiment, the set of discrete frequencies is less granular, for example, the set of discrete frequencies may be every ten or twenty megahertz along the frequency spectrum. In one embodiment, the set of frequencies sampled or observed by polarizability-based spychip scan control 155 is the entire set of discrete frequencies generated by radio 157. In one embodiment, the set of frequencies sampled or observed by polarizability-based spychip scan control 155 is an evenly spaced subset of the discrete frequencies generated by radio 157, depending on the desired, user-selected, level of granularity of the observations across the frequency spectrum.

Once the processor has thus completed generating a time series of measurements over a frequency spectrum and a time period of a combined magnetic field strength of the induced magnetic field and the dynamic electromagnetic interference, processing at process block 515 completes, and processing continues to process block 520.

At process block 520, the processor executes a frequency-domain to time-domain transformation on the time series of measurements to create a set of time series signals that describe combined magnetic field strength over time at a specific frequency range.

In one embodiment, domain transformation module 142 retrieves the completed time series of the scan—the time series of measurements over a frequency spectrum and a time period of a combined magnetic field strength of the induced magnetic field and the dynamic electromagnetic interference—from its location in storage (such as in data store 129). The processor executing domain transformation module 142 then converts the time series of measurements over a frequency spectrum from a frequency domain to a time domain, for example by performing a fast Fourier transform (FFT) or other appropriate transform on the time series of measurements over a frequency spectrum to generate a set of time series of amplitudes at specific frequencies within the frequency spectrum. In one embodiment, the conversion from frequency domain to time domain generates a time series of amplitudes for each sampled/observed frequency included in the scan. The time series of amplitudes at each frequency is included in the set of time series of amplitudes.

In one embodiment, the processor executing domain transformation module 142 further divides or partitions the set of time series of amplitudes at each frequency into multiple "frequency bins," and represents each discrete bin with a representative frequency value. For example, the frequency spectrum (such as the range from 0 MHz through approximately 1 GHz) may be divided into, for example, bins, forming bins 50 MHz wide. Or, in another example, the frequency spectrum may be divided into 100 bins, forming bins 10 MHz wide. In one embodiment, these frequency bins and the associated representative frequency values are equally sized and spaced along the frequency spectrum. In one embodiment, as discussed in further detail above, the representative frequency value may be a frequency value within the range of the bins that has the highest peaks on a power-spectral density (PSD) plot, in accordance with the observation that such signals are likely to be those that also have the highest signal-to-noise ratio. The representative frequency value is identified and selected. In one embodiment the bins and representative frequencies are stored for example in data store 129. In this manner, the execution of the frequency-domain to time-domain transformation includes selecting the frequency that has the highest peaks within the specific frequency range to be the time series signal that describes combined magnetic field strength over time at the specific frequency range. In another embodiment, the representative frequency value may be a frequency value at the middle of the range of the bin, equidistant from the upper and lower bound frequencies for the bin.

Once the processor has thus completed executing a frequency-domain to time-domain transformation on the time series of measurements to create a set of time series signals that describe combined magnetic field strength over time at a specific frequency range, processing at process block 520 completes, and processing continues to process block 525.

At process block 525, the processor monitors the time series signals with a machine learning model trained to predict correct signal values for devices of a same construction as the target electronic device to determine whether there are anomalous measured signal values in the time series signals. For example, the machine learning model has been trained to generate estimates that are consistent with combined electromagnetic field strength of emissions of the repeating test pattern and emissions induced by the applied electromagnetic field for a golden sample device that does not include the passive spychip.

In one embodiment, the processor (for example the processor executing ML predictive analytics module 137) retrieves a trained ML model for the purported construction of the unit under test (the target device), for example from trained ML model library 139. In one embodiment, the trained ML model is configured to predict behavior of a golden system verified to be of the correct construction—therefore, without passive spychips—for its make and model. In one embodiment, the trained ML model is a NLNP regression model, such as an MSET model. In one embodiment, the trained ML model is trained on training time series for the same frequency values as selected in process block 520 above. In one embodiment, the training time series result from signals detected during golden system execution of the oscillating test sequence causing emission of a test pattern of dynamic electromagnetic interference with a regular dynamic period. In one embodiment, the training time series result from signals detected during golden system execution of the oscillating test sequence and also polarizability responses in passive components of the golden system to the application of electromagnetic fields by the polarizability spychip scanner 110.

For example, one method for training the ML model includes steps of inducing a second magnetic field in a passive component of a target golden system verified to be free of passive spychips while the target golden system is emitting the dynamic electromagnetic interference (for example as described herein with reference to process block 510); generating a golden time series of measurements over the frequency spectrum and the time period of a combined magnetic field strength of the induced second magnetic field and the dynamic electromagnetic interference (for example as described herein with reference to process block 515); executing a frequency-domain to time-domain transformation on the golden time series of measurements to create a set of golden time series signals that describe combined magnetic field strength over time for the golden system at a specific frequency range (for example as described herein with reference to process block 520); and training the machine learning model with the golden time series signals, for example by building a mathematical model of each signal value based on the values of all other input signal values through regression.

In one embodiment, where the set of time series of amplitudes at each frequency is not divided into multiple frequency bins, the time series for each frequency is provided as an input to and monitored by the trained machine learning model, with the trained machine learning model trained using the same set of frequencies. This is a more compute-resource-intensive analysis. In one embodiment, where the set of time series of amplitudes at each frequency is divided into multiple frequency bins, the time series of the representative frequency for a set of some of or all of the bins is provided as an input to and monitored by the trained machine learning model, with the trained machine learning model trained using the same set of representative frequencies. This is a less compute-resource-intensive analysis.

In one embodiment, the processor executes the trained ML model to predict or estimate values for the input signals at each observation. These estimated values are recorded along with the actual measured values of the time series. For example, the time series may include a data structure for each observation of a signal that allows for both a measured value and a predicted value. The processor thus generates estimates of electromagnetic field strength that are estimates of combined electromagnetic field strength for the test pattern and emissions induced by application of the electromagnetic field. The processor analyzes the predicted and actual measured values at each observation with a fault detection model to identify anomalous deviations between the predicted and measured signal. In one embodiment, the fault detection model uses the sequential probability ratio test (SPRT), which detects anomalous deviations from normal operation (or faults) by comparing a cumulative sum of the log-likelihood ratio for each successive residual between the measured signals and predicted values to a threshold value indicating that a fault is detected. In one embodiment, the detection (or not) of an anomaly or fault may be recorded on an observation-by-observation basis for the time series. For example, the time series may include a data structure for each observation of a signal that allows for an anomaly detection value in addition to the measured and predicted value. The detection of an anomaly between predicted and actual values of a signal in the unit under test indicates the presence of an unexpected passive component a likely passive spychip.

Once the processor has thus completed monitoring the time series signals with a machine learning model trained to predict correct signal values for devices of a same construction as the target electronic device to determine whether there are anomalous measured signal values in the time series signals, processing at process block 525 completes, and processing continues to decision block 530.

At decision block 530, the processor determines whether there are anomalous measured signal values in the time series signals. In one embodiment, the processor, for example executing the ML predictive analytics module 137, parses the SPRT results for the monitored signals and determines whether any of the SPRT results indicate an anomaly. If the SPRT results indicate an anomaly (Anomaly Detected?: YES), processing at decision block 530 completes and processing continues to process block 535. If the SPRT results indicate no anomaly (Anomaly Detected?: NO), processing at decision block 530 completes and processing continues to process block 540.

At process block 535, the processor presents a message indicating that the target device may contain a passive spychip. In other words, the processor generates an electronic alert that a passive component (e.g., a passive spychip) is present in the target device (electronic system). In one embodiment, the processor generates a message indicating that the target device (the unit under test) may contain a passive spychip, or has otherwise failed to pass the polarizability-based passive spychip scan, and transmits it through network 120 to polarizability spychip scanner 110 for presentation to the user. The message (or other indication of failure to pass the passive spychip scan) may also be transmitted in an email to designated accounts, such as accounts of administrators or engineers who may take further action with the compromised unit under test. The message (or other indication of failure to pass the passive spychip scan) may also be logged or recorded, for example in a log held in data store 129.

In one embodiment, polarizability spychip scanner 110 presents the message to the user of the device following the conclusion of the scan and analysis of the target unit under test. In one embodiment, polarizability-based passive spychip scan control 155 parses the message and extracts the information indicating the failure to pass the passive spychip scan, and in response, generates a GUI indicating that a passive spychip is suspected, and presents the GUI on a display of polarizability spychip scanner 110. In one embodiment, the GUI includes the message, or other information indicating the failure to pass the passive spychip scan. In one embodiment, the displayed GUI includes a visual warning of the potential presence of a passive spychip, such as a red octagonal icon suggesting the color and form of a stop sign, in order to suggest that the user should not install or continue to use the compromised unit under test.

Once the processor has thus completed presenting a message indicating that the target device may contain a passive spychip, processing at process block 535 completes, and processing continues to END block 545, where process 500 ends.

At process block 540, the processor presents a message indicating that the target device is free of passive spychips. In one embodiment, the processor generates a message indicating that the target device (the unit under test) is free of passive spychips, or has otherwise passed the polarizability-based passive spychip scan, and transmits it through network 120 to polarizability spychip scanner 110 for presentation to the user. The message (or other indication of passing the passive spychip scan) may also be transmitted in an email to designated accounts, such as accounts of administrators or engineers who may take further action with the verified unit under test. The message (or other indication of passing the passive spychip scan) may also be logged or recorded, for example in a log held in data store 129.

In one embodiment, polarizability spychip scanner 110 presents the message to the user of the device following the conclusion of the scan and analysis of the target unit under test. In one embodiment, polarizability-based passive spychip scan control 155 parses the message and extracts the information indicating the passing of the passive spychip scan, and in response, generates and a GUI indicating that the unit under test is clear of passive spychips, and presents the GUI on a display of polarizability spychip scanner 110. In one embodiment, the GUI includes the message, or other information indicating the passing of the passive spychip scan. In one embodiment, the displayed GUI includes a visual verification of the absence of passive spychips, such as a green icon suggesting a "green light" to signal the user that the user may install or continue to use the verified unit under test.

Once the processor has thus completed presenting a message indicating that the target device is free of passive spychips, processing at process block 540 completes, and processing continues to END block 535, where process 500 ends.

—Computing Device Embodiment—

Figure 6:
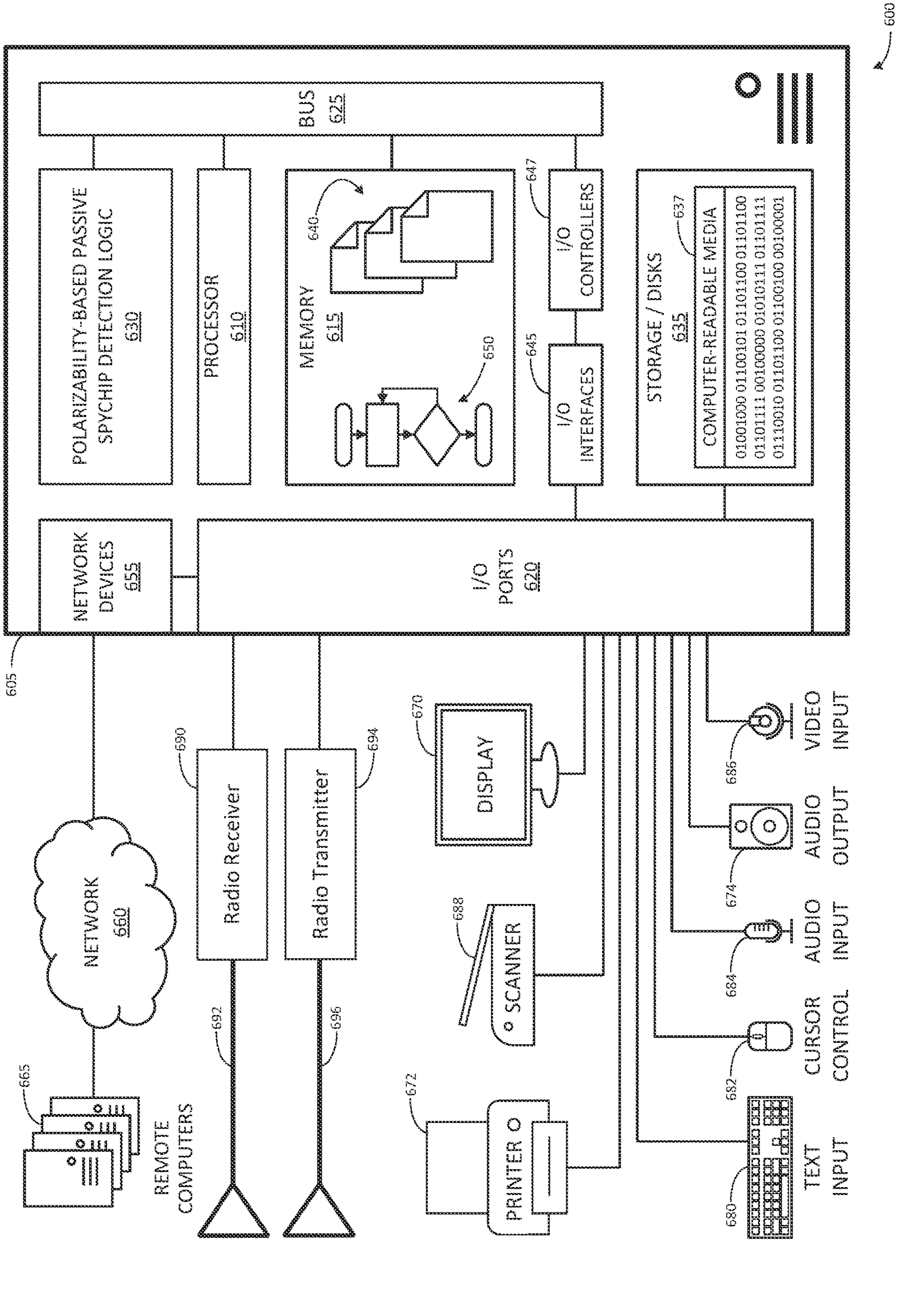
FIG. 6 illustrates an embodiment of a computing system configured with the example systems and/or methods disclosed.

FIG. 6 illustrates an example computing device 600 that is configured and/or programmed as a special purpose computing device with one or more of the example systems and methods described herein, and/or equivalents. The example computing device may be a computer 605 that includes a processor 610, a memory 615, and input/output ports 620 operably connected by a bus 625. In one example, the computer 605 may include polarizability-based passive spychip detection logic 630 configured to facilitate passive spychip detection through monitoring induced magnetic field (polarizability) against dynamic EMI by advanced pattern recognition ML similar to the logic, systems, and methods shown and described with reference to FIGS. 1-5. In different examples, the logic 630 may be implemented in hardware, a non-transitory computer-readable medium with stored instructions 637, firmware, and/or combinations thereof. While the logic 630 is illustrated as a hardware component attached to the bus 625, it is to be appreciated that in other embodiments, the logic 630 could be implemented in the processor 610, stored in memory 615, or stored in disk 635.

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to detect passive spychips through polarizability and advanced pattern recognition. The means may also be implemented as stored computer executable instructions that are presented to computer 605 as data 640 that are temporarily stored in memory 615 and then executed by processor 610.

Logic 630 may also provide means (e.g., hardware, non-transitory computer-readable medium that stores executable instructions, firmware) for performing passive spychip detection through polarizability and advanced pattern recognition.

Generally describing an example configuration of the computer 605, the processor 610 may be a variety of various processors including dual microprocessor and other multi-processor architectures. A memory 615 may include volatile memory and/or non-volatile memory. Non-volatile memory may include, for example, ROM, PROM, and so on. Volatile memory may include, for example, RAM, SRAM, DRAM, and so on.

A storage disk 635 may be operably connected to the computer 605 through, for example, an input/output (I/O) interface (e.g., card, device) 645 and an input/output port 620 that are controlled by at least an input/output (I/O) controller 647. The disk 635 may be, for example, a magnetic disk drive, a solid-state disk drive, a floppy disk drive, a tape drive, a Zip drive, a flash memory card, a memory stick, and so on. Furthermore, the disk 635 may be a CD-ROM drive, a CD-R drive, a CD-RW drive, a DVD ROM, and so on. The memory 615 can store a process 650 and/or a data 640, for example. The disk 635 and/or the memory 615 can store an operating system that controls and allocates resources of the computer 600.

The computer 605 may interact with, control, and/or be controlled by input/output (I/O) devices via the input/output (I/O) controller 647, the I/O interfaces 645 and the input/output ports 620. The input/output devices may include one or more displays 670, printers 672 (such as inkjet, laser, or 3D printers), and audio output devices 674 (such as speakers or headphones), text input devices 680 (such as keyboards), a pointing and selection device 682 (such as mice, trackballs, touchpads, touch screens, joysticks, pointing sticks, stylus mice), audio input devices 684 (such as microphones), video input devices 686 (such as video and still cameras), video cards (not shown), disk 635, network devices 655, sensors (not shown), and so on. The input/output ports 620 may include, for example, serial ports, parallel ports, and USB ports. In one embodiment, the computer may be connected to radio receiver 690, reception antenna 692, radio transmitter 694 and transmission antenna (Tx) 696 through I/O ports 620 or networks 660 in order to transmit polarization frequencies and receive ambient background EMI and polarization-induced EMI from units under test, and otherwise to control and receive data from radio receiver 690 and radio transmitter 694.

The computer 605 can operate in a network environment and thus may be connected to the network devices 655 via the I/O interfaces 645, and/or the I/O ports 620. Through the network devices 655, the computer 605 may interact with a network 660. Through the network 660, the computer 605 may be logically connected to remote computers 665 and, and to radio receivers and transmitters (and associated antennae) of the remote computers. Networks with which the computer 605 may interact include, but are not limited to, a LAN, a WAN, and other networks.

—Software Module Embodiments—

In general, software instructions are designed to be executed by one or more suitably programmed processor accessing memory. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

—Cloud or Enterprise Embodiments—

In one embodiment, EMI fingerprinting service 105 is a computing/data processing system including an application or collection of distributed applications for enterprise organizations. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system is a centralized server-side application that provides at least one or more of the functions disclosed herein and a graphical user interface to access and operate them, and that is accessed by many users via computing devices/terminals communicating with the present computing system (functioning as the server) over a computer network.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a SAAS architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

AAKR: autoassociative kernel regression.
API: application programming interface.
ASIC: application specific integrated circuit.
CD: compact disk.
CD-R: CD recordable.
CD-RW: CD rewriteable.
CPU: central processing unit.
DIMM: dual in-line memory modules.
DRAM: dynamic RAM.
DVD: digital versatile disk and/or digital video disk.
EMI: electromagnetic interference.
EEPROM: electrically erasable PROM.
EPROM: erasable PROM.
FFT: fast Fourier transform.
GPU: graphics processing unit.
GUI: graphical user interface.
HDD: hard drive disk.
HPC: high performance computing.
HTTP: hypertext transfer protocol.
I/O: input/output.
IAAS: infrastructure as a service.
JSON: JavaScript object notation.
LAN: local area network.
ML: machine learning.
MSET: multivariate state estimation technique.
MSET2: Oracle's proprietary multivariate state estimation technique implementation.
NAS: network-attached storage.
NLNP: nonlinear nonparametric.
NN: neural network.
NOSQL: not-only SQL.
OS: operating system.
PAAS: platform as a service.
PCI: peripheral component interconnect.
PCIE: PCI express.
PROM: programmable ROM.
PWM: pulse width modulation.
RAM: random access memory.
REST: representational state transfer.
ROM: read only memory.
Rx: reception antenna/coil.
SDR: software-defined radio.
SOAP: simple object access protocol.
SQL: structured query language.
SRAM: synchronous RAM.
SSD: solid-state drive.
SVM: support vector machine.
TCP/IP: transmission control protocol/Internet protocol.
Tx: transmission antenna/coil.
USB: universal serial bus.
UUT: unit under test.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computing system for detection of a passive component, the computing system comprising:
- a processor operably connected to a memory;
- a radio transmitter operably connected to the processor and the memory;
- a radio receiver operably connected to the processor and the memory;
- one or more non-transitory computer-readable media operably connected to the processor and the memory and storing computer-executable instructions that when executed by the computing system cause the computing system to:
  - apply an electromagnetic field to a target electronic system using the radio transmitter while the target electronic system is emitting a test pattern of electromagnetic interference; and
  - detect the passive component in the target electronic system based on measurements of a combined electromagnetic field strength sensed from the target electronic system by the radio receiver and estimates of electromagnetic field strength without the passive component.

2. The computing system of claim 1,
- wherein the instructions to detect the passive component in the target electronic system based on measurements of a combined electromagnetic field strength sensed from the target electronic system by the radio receiver further cause the computing system to:
  - take measurements of the combined electromagnetic field strength emitted by the target electronic system using the radio receiver while the electromagnetic field is being applied; and
  - detect the passive component based on dissimilarity between the measurements of combined electromagnetic field strength and the estimates of electromagnetic field strength, wherein the estimates of electromagnetic field strength are for the test pattern for a golden electronic system of similar construction to the target electronic system that does not include the passive component; and
- wherein the instructions further cause the computing system to generate an electronic alert that the passive component is present in the target electronic system based on the dissimilarity.

3. The computing system of claim 2, wherein the instructions for taking measurements further cause the computing system to perform a frequency-domain to time-domain transformation of the measurements.

4. The computing system of claim 1, further comprising a transmitting coil connected as an antenna of the radio transmitter, wherein the instructions further cause the computing system to apply the electromagnetic field to the target electronic system by the radio transmitter through the transmitting coil; and a receiving coil connected as an antenna of the radio receiver, wherein the instructions further cause the computing system to sense the combined electromagnetic field strength with the radio receiver through the receiving coil, and wherein the transmitting coil and the receiving coil are arranged concentrically, with the transmitting coil positioned within the receiving coil.

5. The computing system of claim 1, wherein the instructions further cause the computing system to generate a graphical user interface that indicates a suspected presence of the passive component.

6. The computing system of claim 1, wherein the passive component is a spychip.

7. The computing system of claim 2, wherein the instructions further cause the computing system to generate the estimates of electromagnetic field strength using a machine learning model that executes a multivariate state estimation technique.

8. A method for detection of a passive component, the method comprising:

executing, on a target electronic system, a waveform workload that causes the target electronic system to emit a test pattern of electromagnetic interference;

measuring a combined electromagnetic field strength in a location proximate to the target electronic system while applying an electromagnetic field to the target electronic system, wherein the combined electromagnetic field strength results from the electromagnetic field and the test pattern of electromagnetic interference emitted by the target electronic system; and generating an electronic alert that a passive component is present in the target electronic system based on the combined electromagnetic field strength.

9. The method of claim 8, wherein the waveform workload is generated by pulse width modulation.

10. The method of claim 8, further comprising:

detecting the passive component in the target electronic system based on the combined electromagnetic field strength by determining a dissimilarity between the combined electromagnetic field strength and an estimated electromagnetic field strength for the target electronic system without the passive component.

11. The method of claim 8, wherein the measuring the combined electromagnetic field strength includes performing a frequency-domain to time-domain transformation measurements of the combined electromagnetic field strength.

12. The method of claim 8, wherein the electromagnetic field is applied to the target electronic system by a radio transmitter configured with a transmitting coil, wherein the combined electromagnetic field strength is measured by a radio receiver configured with a receiving coil, and wherein the transmitting coil and the receiving coil are arranged concentrically.

13. The method of claim 9, wherein the test pattern is a repeating pattern.

14. The method of claim 10, further comprising generating the estimated electromagnetic field strength using a machine learning model that is configured to execute a non-linear, non-parametric regression algorithm.

15. One or more non-transitory computer-readable media that include stored thereon computer-executable instructions that when executed by at least a processor of a computing system cause the computing system to:

apply an electromagnetic field to a target electronic system while the target electronic system is emitting a test pattern of electromagnetic interference;

measure a combined electromagnetic field strength emitted by the target electronic system; and detect whether a passive spychip is present based on a dissimilarity between the combined electromagnetic field strength and an estimated electromagnetic field strength for the target electronic system without the passive spychip.

16. The non-transitory computer-readable media of claim 15, wherein the instructions further cause the computing system to cause the target electronic system to execute a waveform workload that causes the target electronic system to emit the test pattern.

17. The non-transitory computer-readable media of claim 15, wherein the instructions further cause the computing system to:

while applying the electromagnetic field to a golden electronic system that is emitting the test pattern of electromagnetic interference, measure a second combined electromagnetic field strength resulting from the applied electromagnetic field and the test pattern emitted by the golden electronic system, wherein the golden electronic system is of similar construction to the target electronic system and does not include the passive spychip; and train a machine learning model to generate the estimated electromagnetic field strength based on the second combined electromagnetic field strength.

18. The non-transitory computer-readable media of claim 15, wherein the instructions further cause the computing system to convert measurements of the combined electromagnetic field strength from a frequency- domain to a time-domain.

19. The non-transitory computer-readable media of claim 15, wherein the instructions further cause the computing system to generate an electronic alert that the passive spychip is present based on the dissimilarity indicating that the passive spychip is present.

20. The non-transitory computer-readable media of claim 15, wherein the instructions further cause the computing system to generate an electronic alert that no passive spychips were detected based on the dissimilarity.

* * * * *